(12) United States Patent
Xu et al.

(10) Patent No.: US 11,921,321 B2
(45) Date of Patent: Mar. 5, 2024

(54) ELASTOMERIC LIGHTGUIDE COUPLING FOR CONTINUOUS POSITION LOCALIZATION IN 1,2, AND 3D

(71) Applicant: Cornell University, Ithaca, NY (US)

(72) Inventors: Patricia Xu, Ithaca, NY (US); Robert F. Shepherd, Ithaca, IN (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 17/943,184

(22) Filed: Sep. 12, 2022

(65) Prior Publication Data

US 2023/0048203 A1    Feb. 16, 2023

Related U.S. Application Data

(63) Continuation of application No. 16/767,905, filed as application No. PCT/US2018/063172 on Nov. 29, 2018, now Pat. No. 11,500,152.

(Continued)

(51) Int. Cl.
| | | |
|---|---|---|
| *G02B 6/125* | (2006.01) | |
| *G01B 11/16* | (2006.01) | |

(Continued)

(52) U.S. Cl.
CPC ............ *G02B 6/1221* (2013.01); *G01B 11/16* (2013.01); *G02B 6/125* (2013.01);
(Continued)

(58) Field of Classification Search
CPC ................................. G02B 6/125; G02B 11/16
See application file for complete search history.

(56) References Cited

U.S. PATENT DOCUMENTS

| | | |
|---|---|---|
| 4,295,738 A | 10/1981 | Meltz et al. |
| 4,420,251 A | 12/1983 | James et al. |

(Continued)

FOREIGN PATENT DOCUMENTS

| | | | |
|---|---|---|---|
| DE | 3822512 A1 | * | 1/1990 |
| EP | 1757917 A1 | | 2/2007 |

(Continued)

OTHER PUBLICATIONS

Mac Murray, B.C., et al., A Variable Shape and Variable Stiffness Controller for Haptic Virtual Interactions, 2018 EEE International Conference on Soft Robotics {RoboSoft), Jul. 9, 2018, pp. 1-6. nttps://research.nvidia.com/sites/defaull/files/pubs/2018-04_A-Variable-Shape/Mac%20Murray%20Final%J020180228.pdf.

(Continued)

*Primary Examiner* — Charlie Y Peng
(74) *Attorney, Agent, or Firm* — Barnes & Thornburg LLP

(57) ABSTRACT

Provided are three dimensional, stretchable, optical sensor networks that can localize deformations. The devices described herein are suitable for uses in soft robots to determine the position of external contact, such as touching, and possibly internal deformations that may be caused by actuation. Sensor networks of the present disclosure contain a substrate, such as a 3D lattice, and cores having a cladding, such as air. Light passes through the cores and upon deformation of the substrate, cores may come into contact, allowing light to couple between cores due to frustrated total internal reflection. The resulting changes in intensity in the cores can be used to determine the placement and magnitude of deformation.

25 Claims, 23 Drawing Sheets

Related U.S. Application Data

(60) Provisional application No. 62/642,407, filed on Mar. 13, 2018, provisional application No. 62/592,073, filed on Nov. 29, 2017.

(51) Int. Cl.
 *G02B 6/122* (2006.01)
 *G02B 6/12* (2006.01)

(52) U.S. Cl.
 CPC .............. *G02B 2006/12069* (2013.01); *G02B 2006/12097* (2013.01); *G02B 2006/12138* (2013.01)

(56) References Cited

U.S. PATENT DOCUMENTS

| | | | |
|---|---|---|---|
| 4,484,179 | A | 11/1984 | Kasday |
| 5,363,463 | A | 11/1994 | Kleinerman |
| 6,003,340 | A | 12/1999 | Borak et al. |
| 6,519,382 | B1 | 2/2003 | Jurbergs et al. |
| 8,013,845 | B2 | 9/2011 | Ostergaard et al. |
| 9,063,617 | B2 | 6/2015 | Eliasson et al. |
| 9,811,211 | B2 | 11/2017 | Shimizu et al. |
| 11,662,228 | B2 * | 5/2023 | Kwok ................ G01D 5/35367 250/227.14 |
| 2009/0097808 | A1 | 4/2009 | Whitesides et al. |
| 2010/0074575 | A1 | 3/2010 | Hamada |
| 2011/0098576 | A1 | 4/2011 | Hollstien |
| 2011/0302694 | A1* | 12/2011 | Wang .................... A61B 5/6806 2/160 |
| 2013/0285977 | A1 | 10/2013 | Baharav et al. |
| 2014/0205300 | A1 | 7/2014 | Hemenway, Jr. et al. |
| 2014/0285727 | A1 | 9/2014 | Seo et al. |

FOREIGN PATENT DOCUMENTS

| | | |
|---|---|---|
| EP | 2188701 B1 | 4/2018 |
| JP | 2008145931 A | 6/2008 |
| WO | 2017147573 A1 | 8/2017 |
| WO | 2018/132482 A1 | 7/2018 |

OTHER PUBLICATIONS

Zhao, H., et al., Optoelectronically innervated soft prosthetic hand via stretchable optical waveguides, Science Robotics, Dec. 6, 2016, vol. 1, pp. 1-10.

Paulino, T., 3-Dimensional Soft Magnetic Tactile Sensors for the Human-Friendly Robot Vizzy, University of Lisbon Masters Thesis, Nov. 2003, 7 pages.

Yang, Y., et al., Innovative Design of Embedded Pressure and Position Sensors for Soft Actuators, IEEE Robotics and Automation Letters, Apr. 2018, vol. 3, No. 2, pp. 656-663.

Wu, H., et al., A new robot skin for force and position detection, Industrial Robot: An International Journal, 2014, vol. 41, No. 6, pp. 534-542.

Yun, S., et al., Polymer-Waveguide-Based Flexible Tactile Sensor Array for Dynamic Response, Advanced Materials, Jul. 9, 2014, vol. 26, No. 26, pp. 4474-4480.

* cited by examiner

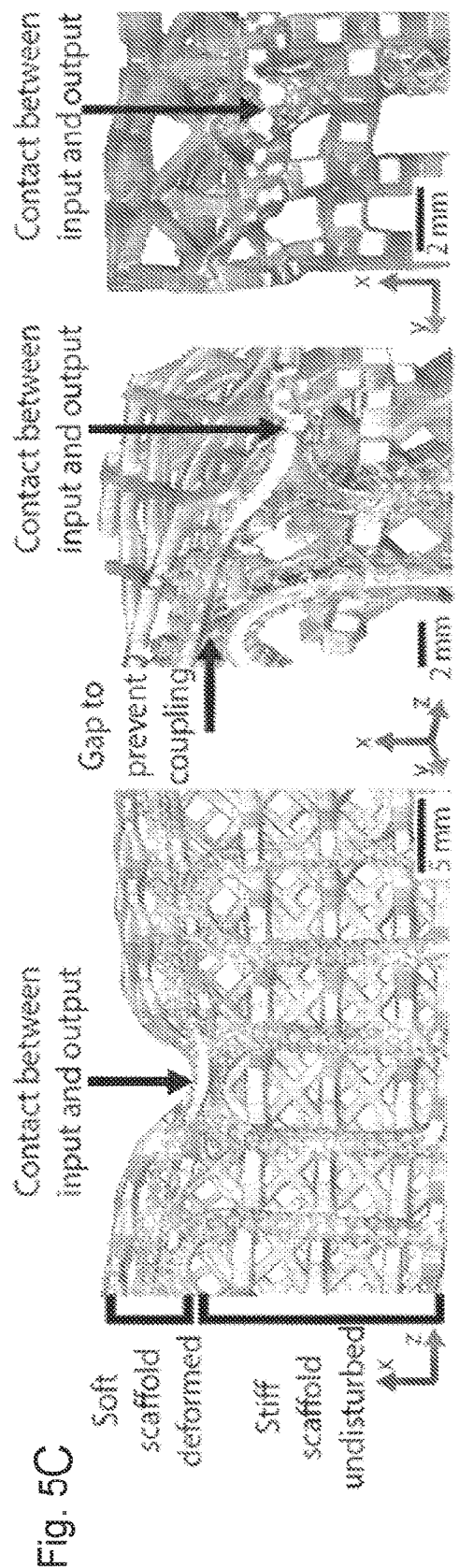
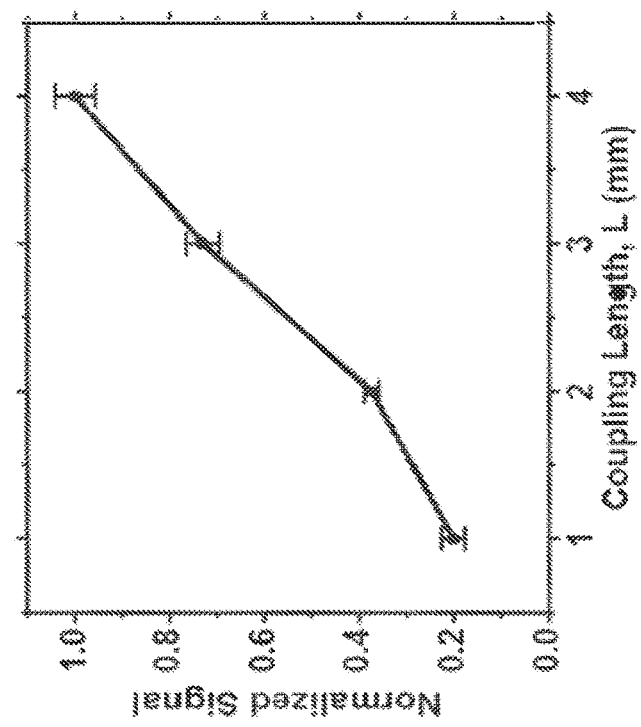
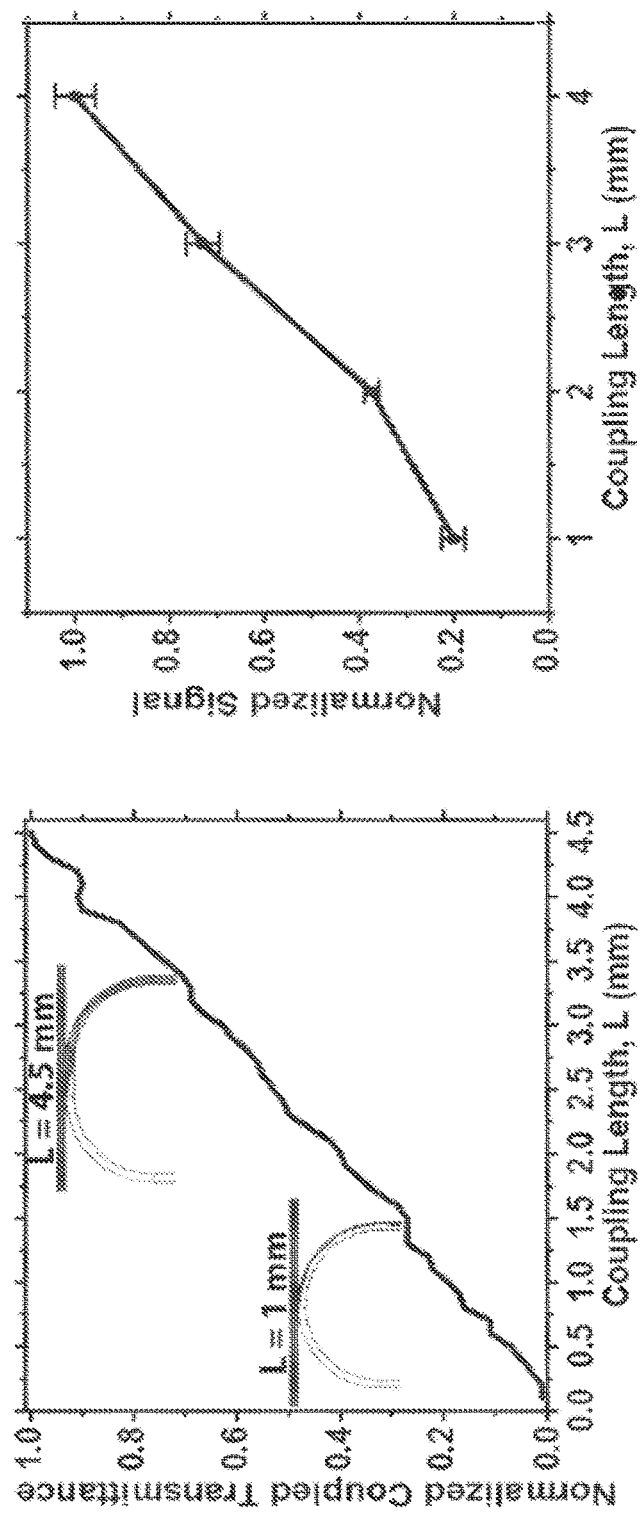
Fig. 5C
Fig. 5D
Fig. 5E

Input

12 Outputs  +  Scaffold

Fig. 11B Compressed state  Fig. 11C FEA model  Fig. 11D Reconstruction

ELASTOMERIC LIGHTGUIDE COUPLING FOR CONTINUOUS POSITION LOCALIZATION IN 1,2, AND 3D

CROSS-REFERENCE TO RELATED APPLICATIONS

This application is a continuation of U.S. application Ser. No. 16/767,905, filed on May 28, 2020, which is a U.S. national stage entry of PCT International Patent Application No. PCT/US2018/063172, filed Nov. 29, 2018, which claims priority to U.S. Provisional Application No. 62/592,073, filed on Nov. 29, 2017, and U.S. Provisional Application No. 62/642,407, filed on Mar. 13, 2018, the disclosure of each of which is incorporated herein by reference.

STATEMENT REGARDING FEDERALLY SPONSORED RESEARCH

This invention was made with government support under contract no. TL1-TR-002386 awarded by the National Institutes of Health and contract nos. FA9550-18-1-024 and N00014-17-1-2837 awarded by the Department of Defense. The government has certain rights in the invention.

FIELD OF THE DISCLOSURE

The present disclosure relates to force sensors, and in particular, sensors for use in soft robotics.

BACKGROUND OF THE DISCLOSURE

Animals and humans rely on their sense of touch and proprioception to interact with the world and complete complex tasks. We perceive the external world through complex networks of mechanoreceptors under our skin and in our muscles that sense deformations and send signals to your brain for processing to determine what happened. The ability to localize external touch and understand the state of our bodies allows us to interact with the world in complex ways such as playing the piano. The field of soft robots strives to create deformable robots that can match the capabilities of animals. To do this, soft robots require similar sensing capabilities for control to complete complex actions. However, there are not many soft robots that incorporate internal sensing systems to both increase their ability to interact with the world and measure the state of deformation. Within the field of soft robots and wearable electronics, many flexible and stretchable sensors have been developed to measure changes in resistance, capacitance, voltage, or light to detect deformations. Among these, soft or flexible, planar sensor arrays using resistance, capacitance, and the piezoelectric effect have demonstrated touch and deformation localization. However, the use of optical sensors is advantageous as they have low hysteresis, linearity, tunable sensitivity, and chemical stability. Some flexible but not stretchable optical sensor grids have been made with silica or plastic optical fibers embedded within a 2D silicone sheet. Stretchable planar optical sensors utilizing frustrated total internal reflection to leak light to the outside or fiber bragg gratings to shift the spectrum of light when touched have also been used in displays for wearable electronics. While all these sensors are great for wearable and flexible electronics, the planar fabrication method and form is difficult to adapt to the 3D shape of soft robot internals which is necessary for simple fabrication and complex internal sensing. Putting premade planar sensors into soft robots would require laminating layers, which often causes premature failure through delamination and is time consuming.

BRIEF SUMMARY OF THE DISCLOSURE

The present disclosure relates to a 3D, stretchable, optical sensor network that can localize deformations. In various embodiments, devices described herein enable soft robots to know the position of external touches and possibly internal deformations due to actuation. Embodiments of the present disclosure are achieved by innervating a soft, 3D printed lattice structure with stretchable waveguide cores designed to sit near, but not touching each other in an unstrained state. Under deformations that can be caused by external forces or shape change, certain cores will come into contact with each other allowing light to couple between cores due to frustrated total internal reflection. The resulting intensity changes in certain cores will be used to calculate the placement of deformations.

Examples of waveguides are disclosed in PCT/US17/19659, which is hereby incorporated by reference in its entirety.

In an embodiment, a device for use in human-computer interactions, human-robot interactions, sports equipment, medical equipment/implants, and wearable sensors is disclosed. For example, military and first responder uniforms, prosthetics, orthotics, or vehicle/aircraft interiors may benefit from the device disclosed herein.

The present disclosure further provides description of a platform for creating arbitrary 3D grids of soft, stretchable lightguides for spatially continuous deformation sensing. These networks also function as structural components of robots, and therefore must be co-designed with function in mind. The physical principle allowing this ability is frustrated total internal reflection—when a powered input core touches unpowered output cores, light couples into them, allowing the position to be known. To determine the extensive capabilities of this system, mechanical analysis, optical simulation, x-ray imaging, and sensor characterization were performed on soft optoelectronic lightguide arrays (SOLA). To demonstrate the capabilities of SOLAs, soft computer interfaces were created, which demonstrate the exteroceptive ability by locating finger presses and proprioceptive ability by tracking structural deformation volumetrically.

DESCRIPTION OF THE DRAWINGS

For a fuller understanding of the nature and objects of the disclosure, reference should be made to the following detailed description taken in conjunction with the accompanying drawings, in which:

FIG. 5C. Experimental validation. Sliced micro X-ray CT scan reconstructions of lightguide-lattice composites with contact between cores labeled. (middle, right) Zoomed in CT reconstructions showing the contact and orientation of the cores at the deformation site under high deformation.

FIG. 5D. Experimental validation. Simulated signal coupled from input to output as coupling length increases.

FIG. 5E. Experimental validation. Measured normalized signal between two straight cores as coupling length increases.

FIG. 11B. Proprioception. Actual structure from FIG. 11A.

FIG. 11C. Proprioception. FEA simulated model from FIG. 11A.

FIG. 11D. Proprioception. computer reconstructed cylinder during compression from FIG. 11A.

DETAILED DESCRIPTION OF THE DISCLOSURE

In the description provided in the accompanying example, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and/or other changes may be made without departing from the scope of the present invention. The provided description of example embodiments is, therefore, not to be taken in a limited sense.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the disclosure provided herein.

The present disclosure provides a 3D, stretchable, optical sensor network that can localize deformations. A network of the present disclosure enables soft robots to know the position of external touches and possibly internal deformations due to actuation. This is done by innervating a soft, 3D printed lattice structure with stretchable waveguide cores designed to sit near but not touching each other in an unstrained state. Under deformations that can be caused by external forces or shape change, certain cores will come into contact with each other allowing light to couple between cores due to frustrated total internal reflection. The resulting intensity changes in certain cores is used to calculate the placement of deformations.

Figure 2A:
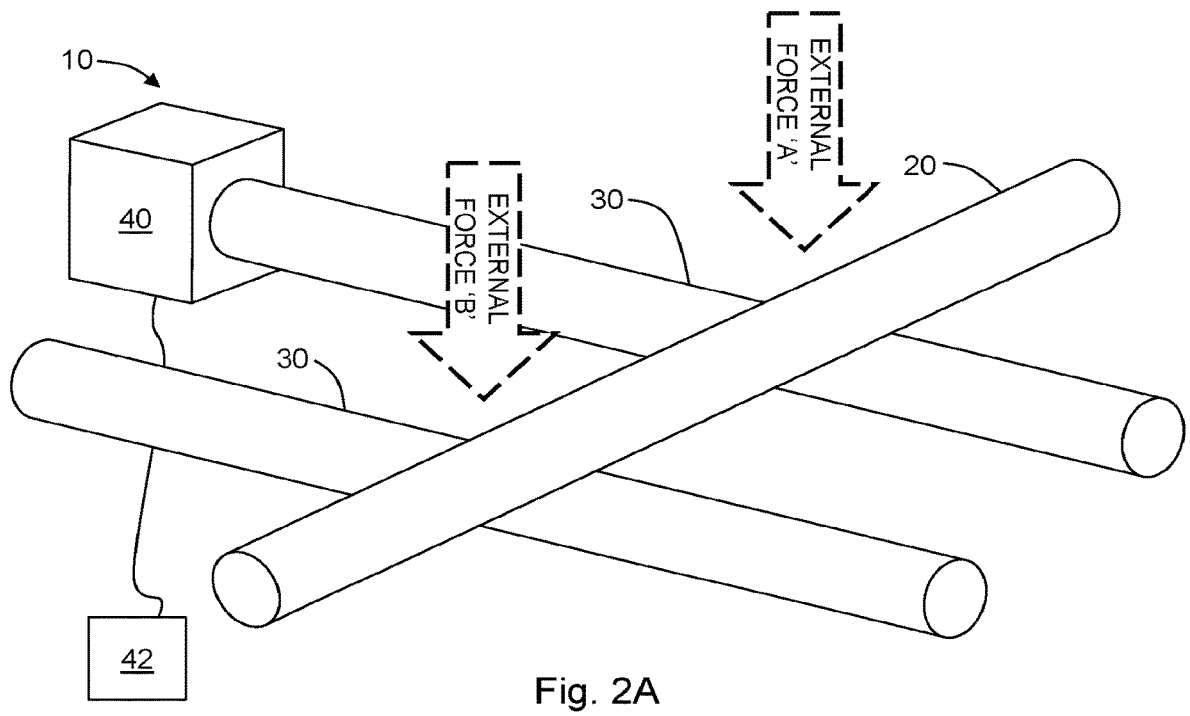
FIG. 2A. Perspective diagram of a device according to an embodiment of the present disclosure (the substrate is not shown).
Figure 2B:
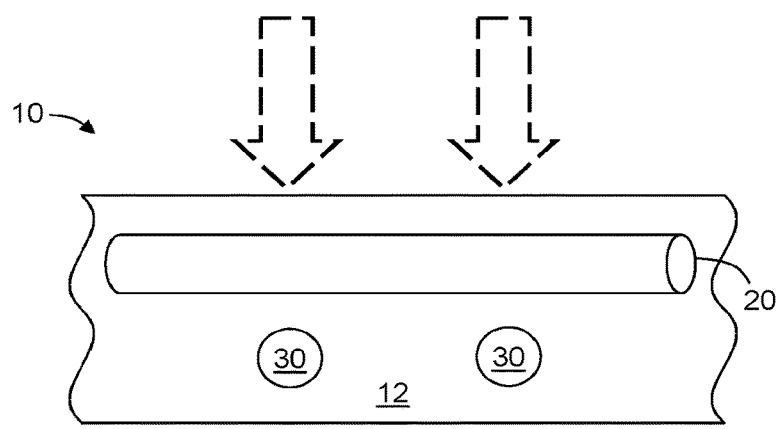
FIG. 2B. Side elevation view of the device of FIG. 2A (the substrate is shown).

With reference to FIGS. 2A and 2B, in a first aspect, a device 10 for detecting an external force is provided. The device 10 includes a deformable substrate 12 in which a first waveguide 20 is disposed. The substrate 12 may comprise an elastomer. In some embodiments, the substrate 12 may comprise silicone, polyurethane, polyacrylate, and/or any similar polymer, or combinations of polymers. The substrate 12 may be made from a material having an elastic modulus of 10 kPa to 100 MPa, inclusive, or any value or range therebetween. The substrate 12 may be, for example, a lattice, such as a polymer lattice (see, for example, Figure(s) 1A, 1C, and 1D). In non-limiting embodiments having polymer lattice substrates, the polymer lattice is made up of a plurality of struts (see, e.g., FIGS. 13A-13D). The struts may have strut diameters of 0.75 mm to 1.125 mm, including all 0.001 mm values and ranges therebetween. In other embodiments, struts may have larger or smaller diameters. Within a lattice, struts need not have the same diameters. For example, as further described in the Exemplary Embodiments below, the lattice may have regions with differing rigidity where the struts have different diameters. Other strut characteristics (e.g., material(s), length, shape, etc.) may also be designed to provide lattice properties advantageous in a given application. In some embodiments, the substrate 12 is a deformable monolithic material.

The first waveguide 20 is capable of transmitting electromagnetic radiation. For example, the first waveguide 20 may be configured to transmit visible light, infrared light, ultraviolet light, etc. In non-limiting embodiments described herein, suitable waveguides configured to transmit light are referred to as "lightguides." The first waveguide 20 may comprise clear silicone, clear polyurethane, clear polyacrylate, and/or any polymer with a similar refractive index. Such materials have refractive indices suitable for use as a core of a waveguide where air forms at least part of the cladding of the waveguide. Other materials (core/cladding combinations) will be apparent to one having skill in the art in light of the present disclosure. The first waveguide 20 may have a diameter of 100 µm to 1 cm, inclusive, or any value therebetween. In some embodiments, the diameter of the first waveguide 20 may be larger or smaller than this range.

A second waveguide 30 is disposed in the substrate 12. The first waveguide 20 and the second waveguide 30 are arranged so as to couple when the substrate 12 is deformed by an external force. By coupling, electromagnetic radiation is permitted to be transmitted between the first waveguide 20 and the second waveguide 30. In an example, when light is transmitted through the first waveguide 20, at least a portion of the light is coupled into the second waveguide 30 and transmitted therethrough (e.g., via frustrated total internal reflection).

The second waveguide 30 is spaced apart from the first waveguide 20 when the substrate 12 is not deformed (in an initial state, for example, when no external forces are applied). The second waveguide 30 may be, for example, a distance of less than or equal to 5 mm from the first waveguide 20. When an external force is applied to the device 10 in a location near the first and second waveguides 20, 30, the force will cause the substrate 12 to deform such that the distance between the first waveguide 20 and the second waveguide 30 is reduced. Once the distance is sufficiently reduced, electromagnetic radiation (e.g., light) transmitted through the first waveguide 20 is able to pass into the second waveguide 30.

The second waveguide 30 is capable of transmitting electromagnetic radiation. For example, the second waveguide 30 be configured to transmit visible light, infrared light, ultraviolet light, etc. The second waveguide 30 may comprise clear silicone, clear polyurethane, clear polyacrylate, and/or any polymer with a similar refractive index. Such materials have refractive indices suitable for use as a core of a waveguide where air forms the cladding of the waveguide. Other materials (core/cladding combinations) will be apparent to one having skill in the art in light of the present disclosure. The second waveguide 30 may have a diameter of 100 µm to 1 cm, inclusive, or any value therebetween. In some embodiments, the diameter of the second waveguide 30 may be larger or smaller than this range. The second waveguide 30 may be configured the same as the first waveguide 20 or different from the first waveguide 20.

Figure 3:
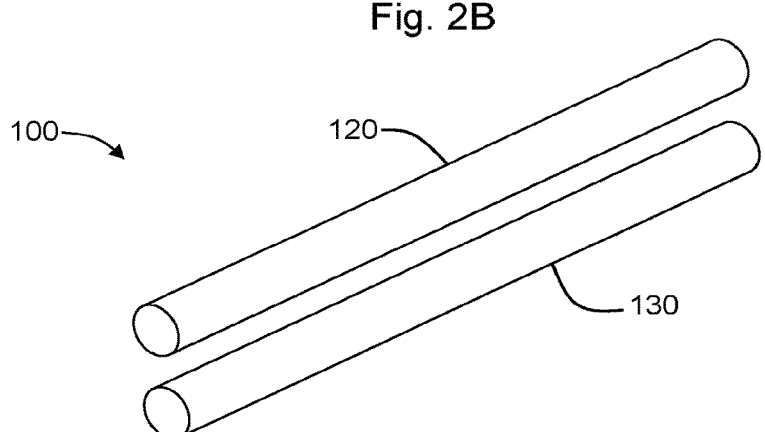
FIG. 3. A perspective diagram of a device according to another embodiment of the present disclosure (the substrate is not shown).

The first waveguide and the second waveguide may be arranged at any angle and/or configuration relative to each other. For example, in the device 100 of FIG. 3, the first waveguide 120 is parallel with the second waveguide 130. In another embodiment, the first waveguide is orthogonal to the second waveguide. It should be noted that such arrangements are described at the coupling region—the region where the waveguides are intended to couple due to the application of an external force—and other portions of the waveguides may not have the same arrangement. For example, in the embodiment depicted in FIG. 1C, the second waveguides (labeled "Output lightguides") are 'U'-shaped and are parallel to the first waveguide ("Input lightguide") at the top of each U-shape in the figure.

In some embodiments, a plurality of second waveguides 30 are disposed in the substrate 12. In such embodiments, each second waveguide 30 may be configured the same as or different from each other second waveguide 30. For example, the second waveguides 30 may each have a same or different length from one another (i.e., independently from the others). In another example, the second waveguides 30 may each have a same or different diameter from one another (i.e., independently from the others).

In some embodiments, the electromagnetic radiation coupled between the waveguides is related to the magnitude of the external force. For example, as the magnitude of the external force is increased, the first and second waveguides are more strongly coupled (e.g., the distance between the first and second waveguides may be reduced further), and more of the electromagnetic radiation of the first waveguide may pass into the second waveguide.

In some embodiments, the device 10 may further comprise a detector 40 configured to receive electromagnetic radiation from the second waveguide 30. For example, a photodiode may be coupled to the second waveguide 30 to receive visible light. In this way, the photodiode may detect light coupled into the second waveguide 30 from the first waveguide 20. The device 10 may include a controller 42 in electronic communication with the detector 40, and the controller 42 may be configured to determine a magnitude of external force applied based on the electromagnetic radiation received at the detector 40. In some embodiments, a source 44 may be coupled to the first waveguide 20 in order to provide electromagnetic radiation into the first waveguide 20. For example, an LED may be coupled with the first waveguide so as to provide light into the waveguide.

In another aspect, the present disclosure may be embodied as a method for detecting an external force. The method includes providing a device according to any of the embodiments described herein. For example, the provided device may include a deformable substrate, a first waveguide is disposed in the substrate, and a second waveguide disposed in the substrate, wherein the first waveguide and the second waveguide are configured to couple when the substrate is deformed. The method includes transmitting electromagnetic radiation through the first waveguide, deforming the substrate with an external force, and coupling the first waveguide with the second waveguide as the substrate is deformed by the external force, thereby transmitting at least a portion of the electromagnetic radiation of the first waveguide through the second waveguide.

EXEMPLARY EMBODIMENTS

The examples shown herein are intended to illustrate particular embodiments of the present invention, and are not intended to limit the scope of the present invention.

Soft Optoelectronic Lightguide Array (SOLA) System Design

The location of an external force can be localized by allowing light guided within an input lightguide (i.e., first waveguide) to couple into one or multiple output lightguides (i.e., second and additional waveguides) when they come in contact. When there are no deformations or external forces, the input and output lightguides are separated by an air gap which prevents coupling as seen in the middle images of FIGS. 1A and 1B. When an external force, such as a finger press, causes local deformation of the lattice, the input lightguide contacts one or more output lightguides. Due to frustrated total internal reflection, some light couples into the output lightguide and the intensity change can be read with a photodetector.

Figure 1A:
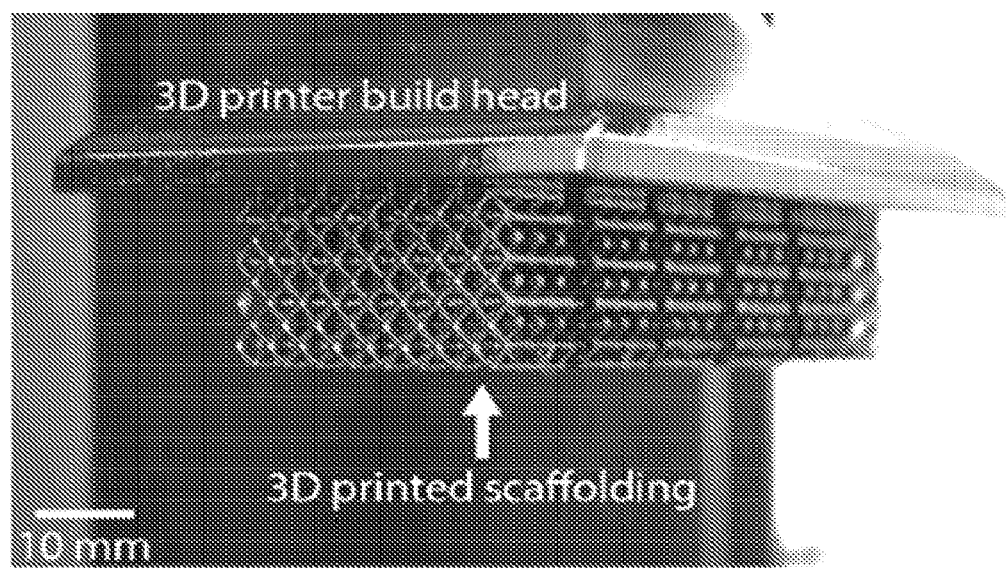
FIG. 1A. Fabrication and design overview. 3D printed soft scaffolding with embedded channels left vacant for post-threading with elastomeric lightguide cores.
Figure 1B:
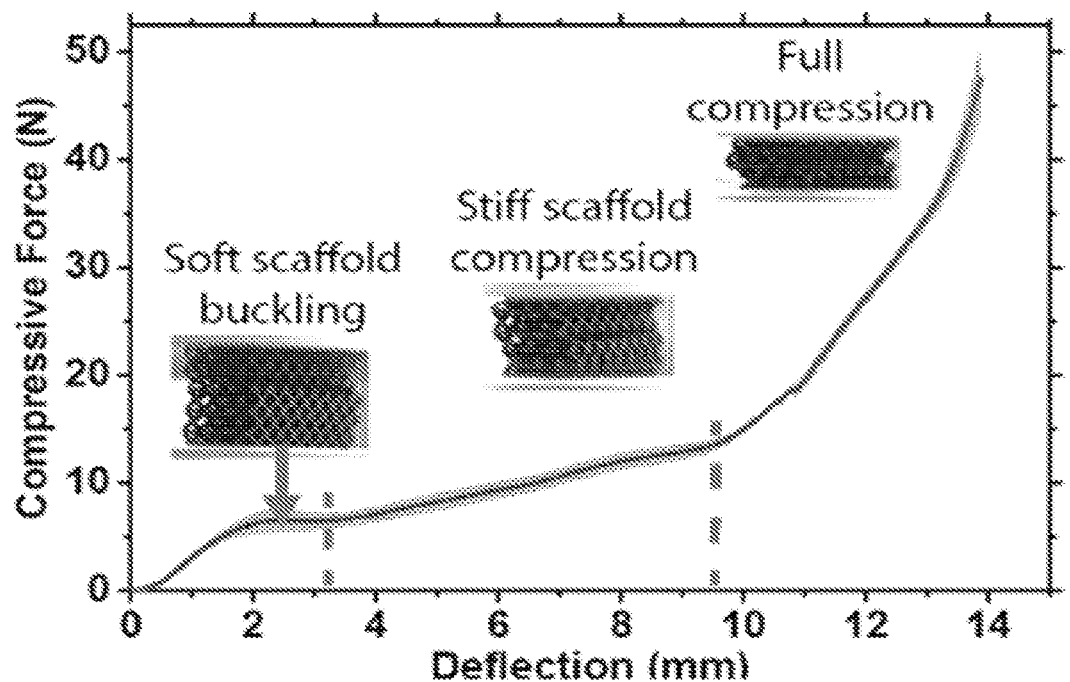
FIG. 1B. Fabrication and design overview. Average of eight compression tests of a 3D printed lattice with one standard deviation above and below the average in gray.
Figure 1C:
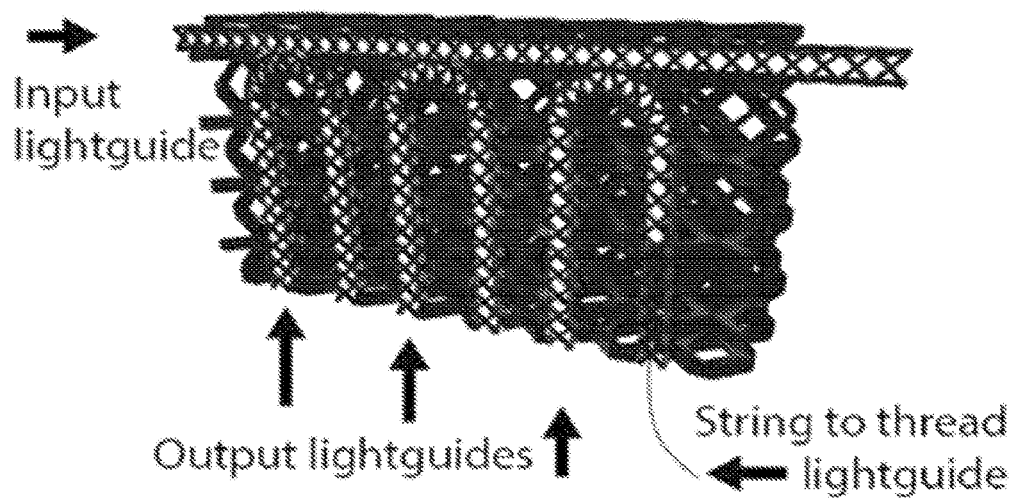
FIG. 1C. Fabrication and design overview. Schematic cross section showing the lightguides and the threading procedure used to pull the cores into place.
Figure 12A:
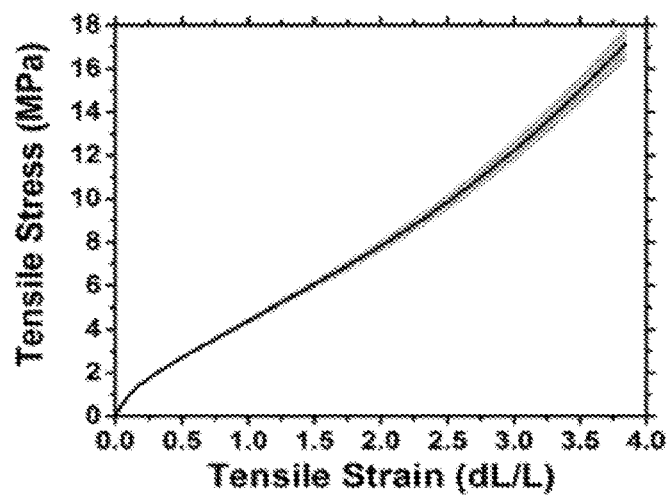
FIG. 12A. Average tensile data taken over eleven samples with a single standard deviation above and below in gray.
Figure 12B:
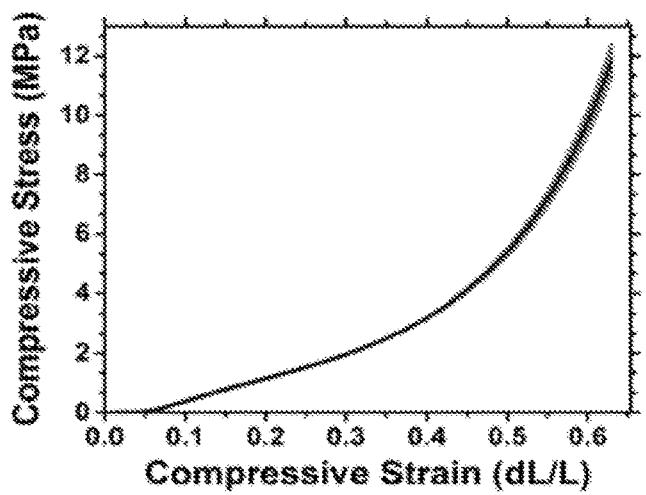
FIG. 12B. Average compression data taken over seven samples with a single standard deviation above and below in gray.
Figure 12C:
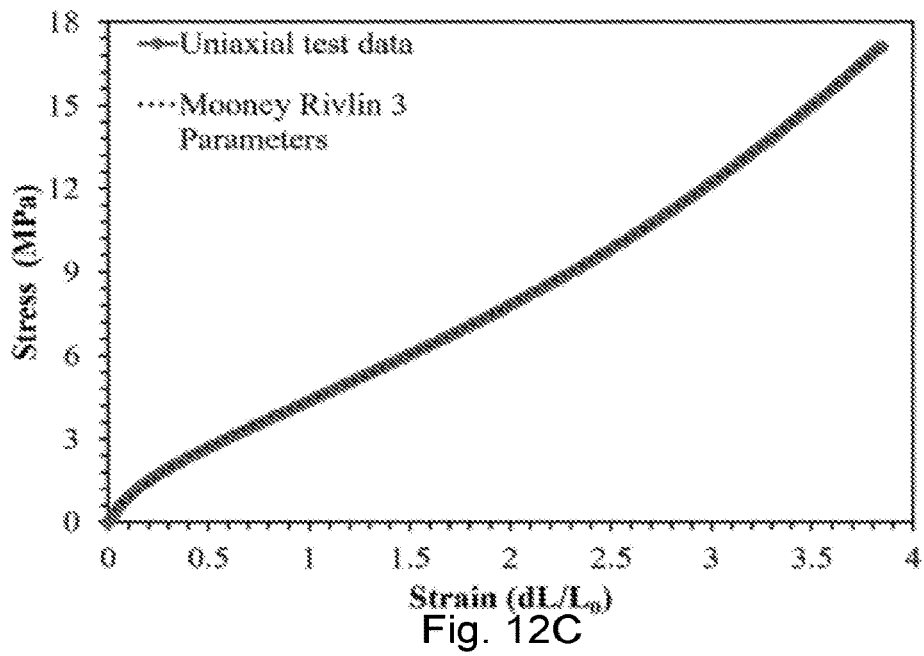
FIG. 12C. Mooney Rivilin fit to uniaxial tensile data for FEA analysis.

Using a commercially-available, high-resolution (minimum feature size ~40 μm), rapid (<0.5 m hr$^{-1}$) 3D printing technique (CLIP (44); Carbon M1), a scaffolding (i.e., lattice) was created from elastomeric material (EPU 40; FIG. 12A-12C) to house a four-cored SOLA system (FIG. 1A). The network was labeled as SOLA$_{1,3}$, where the notation 1,3 represents one powered input lightguide and three unpowered output lightguides. Since the mechanical properties of the 3D-printed lattice would affect the interaction of the elastomeric lightguides and vice versa, the structural layout of both components were co-designed such that the various deformations of the lattice would cause one or more of the output waveguides to contact the input lightguide in the desired location(s). For example, the SOLA$_{1,3}$ depicted in FIG. 1C was designed as a variable stiffness scaffold that is softer on top for use as, for example, a touch interface to measure external presses. The scaffold stiffness was changed by designing the top to be softer than the bottom by varying strut thicknesses (t). These struts deform via buckling and bending modes:

$$F_{buckle} = \frac{\pi^2 E t^4}{12 l^2} \quad (1)$$

$$F_{bend} = \frac{3\delta E t^4}{12 l^3} \quad (2)$$

where E is the elastic modulus, δ is the deflection, and l is the length of a strut. For the exemplary printed geometry, this quartic dependence on thickness resulted in large behavior differences of the layers upon compression. The top layer, t~0.75 mm, buckled at F$_{comp}$≈6 N, while the bottom, t~1.125 mm, bent until F$_{comp}$=12 N (FIGS. 1B and 4B) and did not exhibit buckling behavior. This complex response to force is advantageous for touch interfaces because a finger press provides sufficient stress to completely deform the top layer while the bottom layer provides significant resistance to deformation. The difference in stiffness also increased the sensitivity of the SOLA by concentrating the lattice deformation to the region where an air gap separates the input and output lightguides. The cores were fixed in place within this area of interest using lattice-work guide channels (FIG. 1C).

Optical Array Design and System Fabrication:

After printing, the scaffold was "innervated" with polyurethane lightguides (StretchMagic, Pepperell Braiding Co., MA), having a diameter d$_{out}$=1 mm for the output lightguides, and d$_{in}$=1.5 mm for the input lightguide by threading the lightguides into channels within the lattice. The porosity of the channel walls, $\phi_{air}$=A$_{air}$/(A$_{air}$+A$_{EPU}$)=0.8, allowed the cores to guide more light than channels without porosity by increasing the numerical aperture (NA=0.174 without and NA=0.922 with porosity) and critical angle ($\phi_{crit}$=52.63° without and $\phi_{crit}$=83.42° with porosity) due to the increased difference in refractive index between the poly urethane of the scaffolding and the poly urethane of the cores (n$_{core}$=1.52; n$_{air}$=1.0; n$_{EPU}$=1.51 at λ=850 nm).

In an example, contact of two lightguides occurs when the core of one lightguide contacts the core of the other lightguide.

Figure 1D:
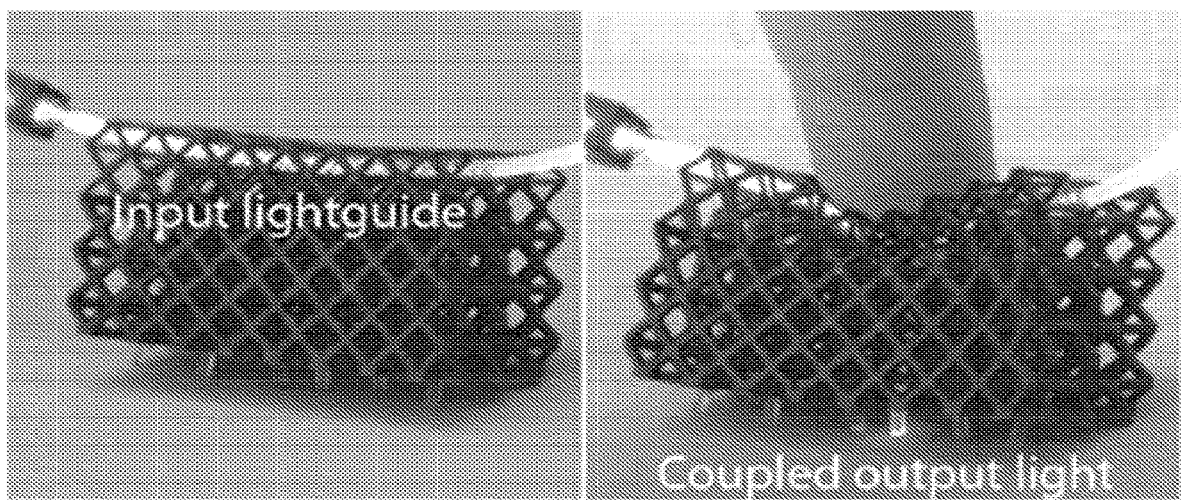
FIG. 1D. Fabrication and design overview. (Left) An LED illuminates the input core and (Right) light couples to an output core when deformed.

The interconnected guide channels also allowed the coupling of light during contact between the input and output lightguides. When deformation of the lattice causes the input lightguide to contact an output lightguide, the optically-powered input lightguide leaks light into the unpowered output lightguides via frustrated total internal reflection (FIG. 1D). In the present exemplary SOLA system, the output lightguides were U-shaped, lined up next to each other, and optically separated from the straight input lightguide by a small air gap (FIG. 1C). This configuration allowed the output lightguides to be parallel to the input lightguide so that "line"-contact (not "point"-contact)

occurred. This increased the dynamic signal range by increasing the core coupling lengths as deformation increased.

Figure 13A:
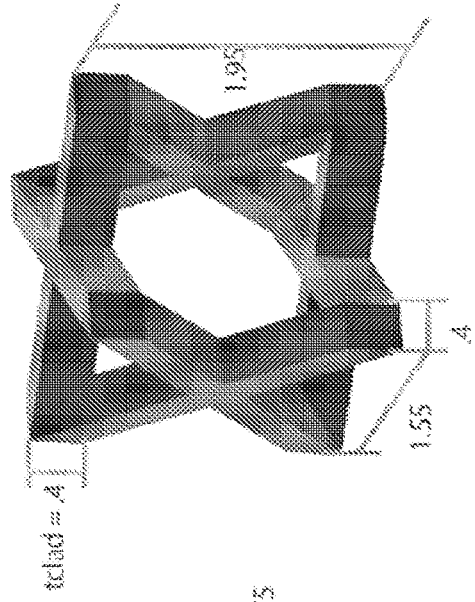
FIG. 13A. Isometric view with overall dimensions of the $SOLA_{1,3}$.
Figure 13B:
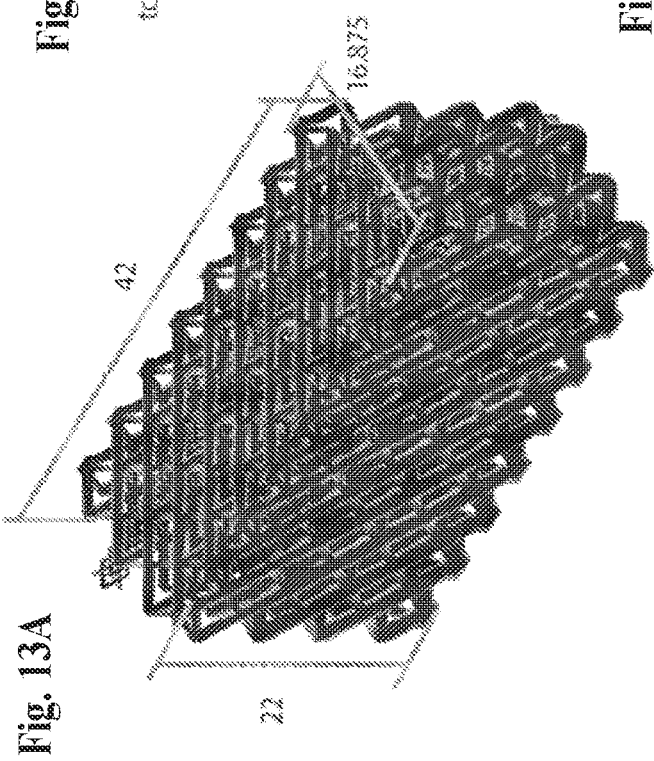
FIG. 13B. Front view with the center to center spacing and width of the U-shaped output lightguides shown.
Figure 13C:
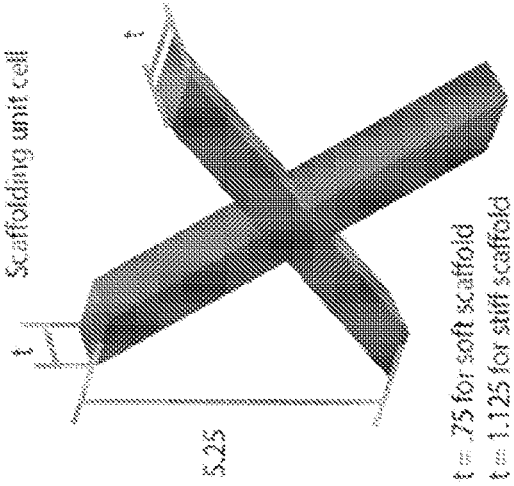
FIG. 13C. Unit cell of the lattice work cladding with relevant dimensions shown.
Figure 13D:
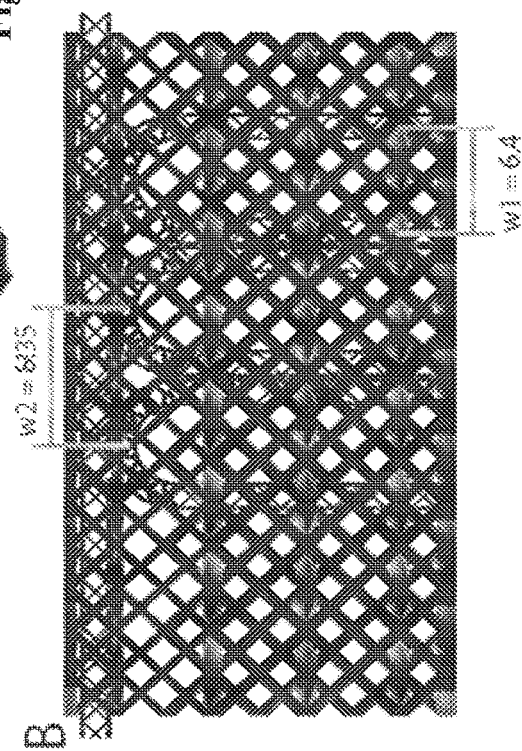
FIG. 13D. Unit cell of the scaffolding with relevant dimensions shown.

Using detectors, the power from all the output lightguides was measured to interpret the position of localized deformations. In the exteroceptive structures of the present exemplary embodiment, the output lightguides were designed to be about the width of a human fingertip, $w_1$=6.4 mm (FIG. 13B), so a touch directly above an output lightguide would produce only one signal for simple processing. To continuously measure the location of touch, the cores were placed close together so a single finger press would always cause contact between the input lightguide and one or more output lightguides (FIG. 13B). In the case where multiple output lightguides are contacted, the touch position can be calculated using the ratio of intensities in the neighbouring (i.e., contacted) output lightguides.

Experimental Validation

Figure 5A:
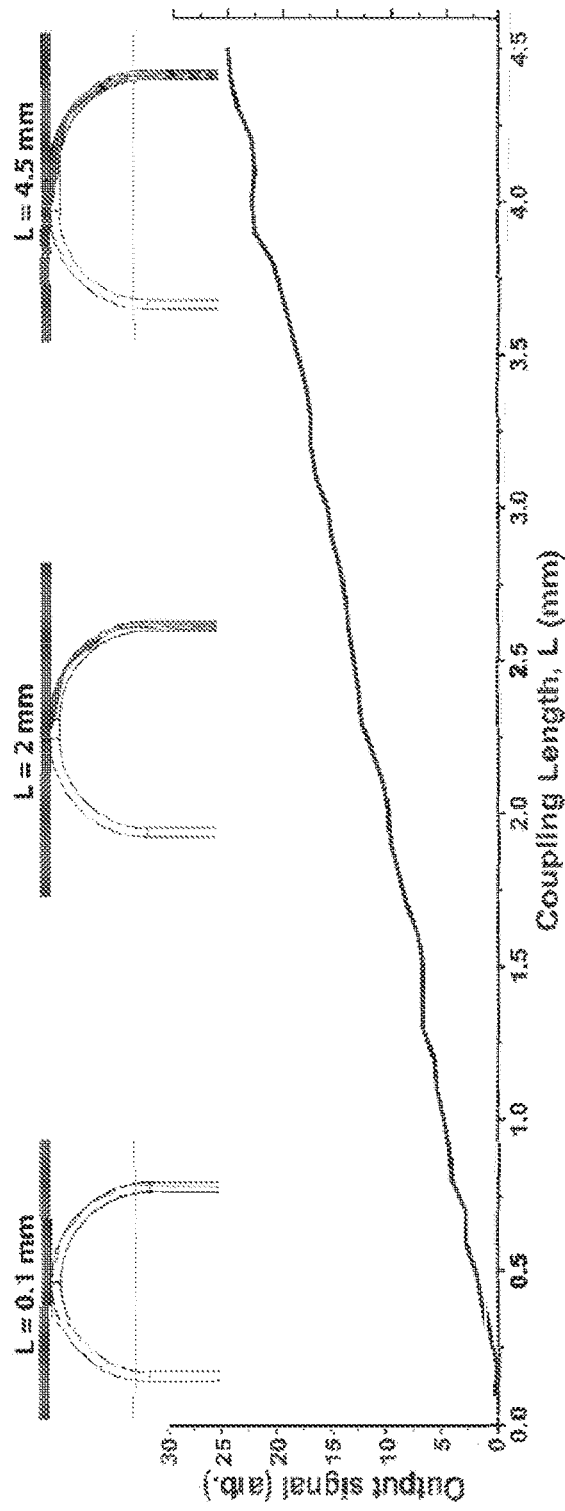
FIG. 5A. COMSOL simulation plot of relative intensity at the output end vs coupling length (L) defined as the length of the horizontal path on the output.
Figure 8A:
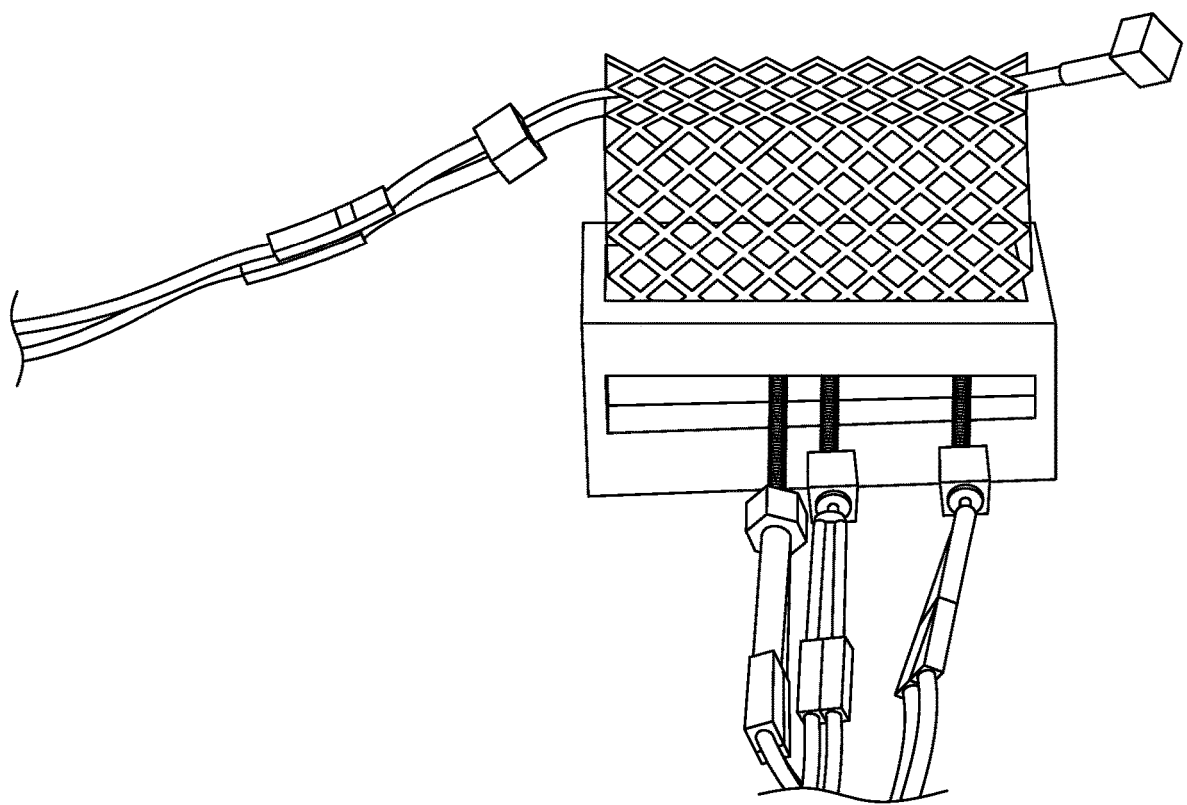
FIG. 8A. Exemplary device and setup used to obtain data shown in FIGS. 6A-6F.
Figure 8B:
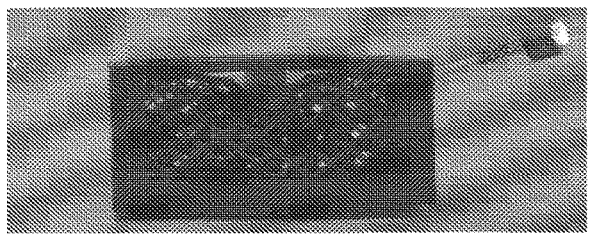
FIGS. 8B and 8C. Exemplary device that was CT scanned with LED to show that the light coupled only in the output lightguide below the source of the external force. The LED was removed for the CT scan.
Figure 8C:
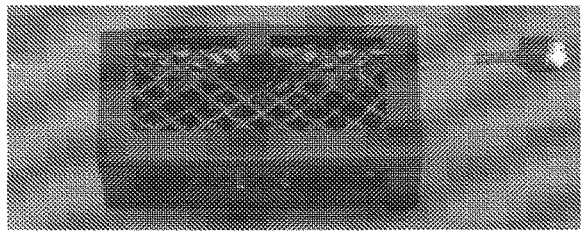
Figure 9:
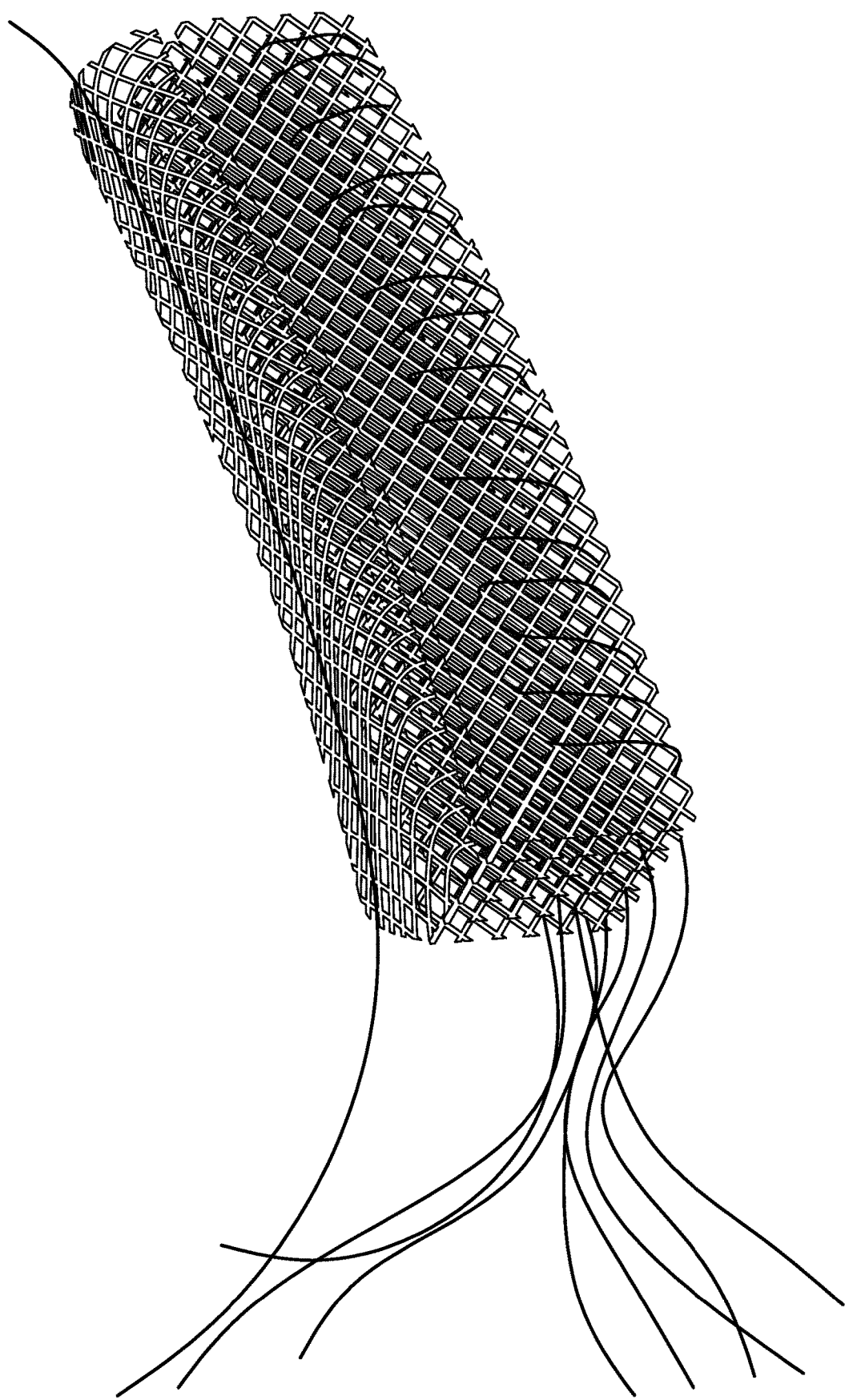
FIG. 9. Musical instrument embodiment with only microfilament strings in place before any lightguides were inserted. These strings were affixed to the ends of each lightguide and were used to pull the lightguides into place within the lattice.
Figure 10A:
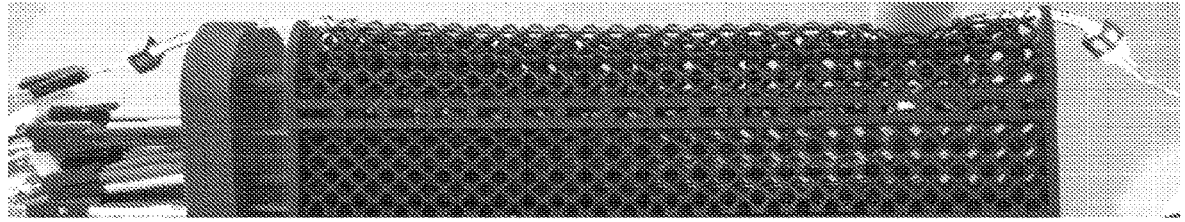
FIGS. 10A-10D. Any color for visual data or data light can be used however some wavelengths are carried or guided better than others through the lightguides.
Figure 10B:
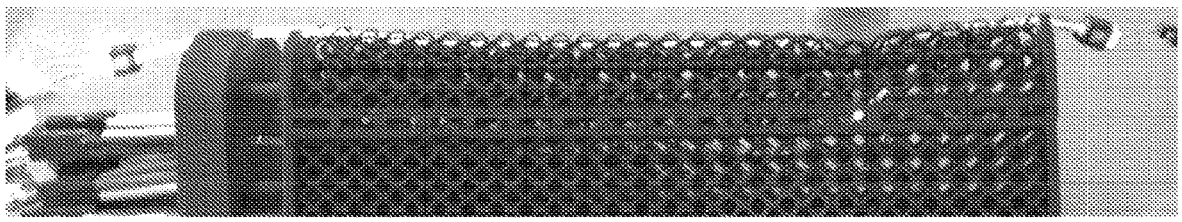
Figure 10C:
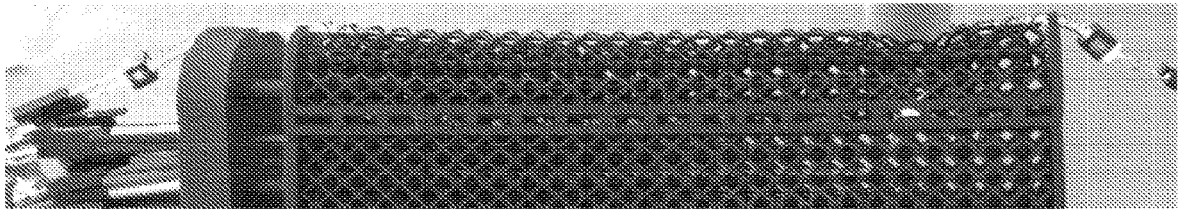
Figure 10D:
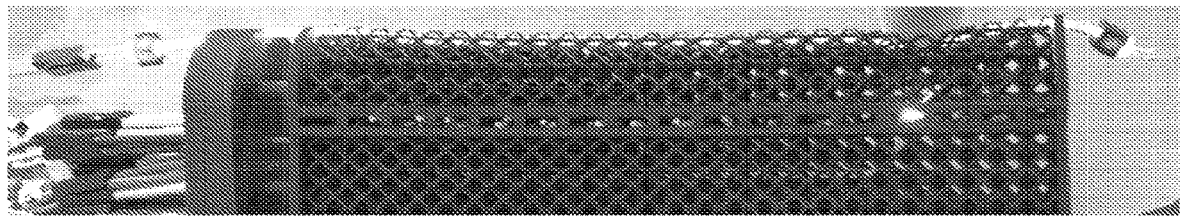

X-ray micro computed tomography (μ-CT) was used to image the exemplary $SOLA_{1,3}$ in a deformed state (FIGS. 8A and 8B). The 3D reconstructions show the variable stiffness scaffolding deforms as designed, with the stiff scaffold undisturbed even with full compression of the soft segment (FIG. 5D, left). Additionally, due to the high compliance of the scaffold, external forces resulted in highly-localized deformations, allowing touch (external force) location to be determined simply and accurately. The coupling length also increased with force as designed with 3.5 mm of contact seen due to the large deformation. Even under large deformation (Δh=5 mm), light remained coupled; the CT scan revealed that, at these extreme deformations, the input lightguide rolled to the side of the output lightguide instead of contacting from above (Figure SD, middle and right).

Figure 14A:
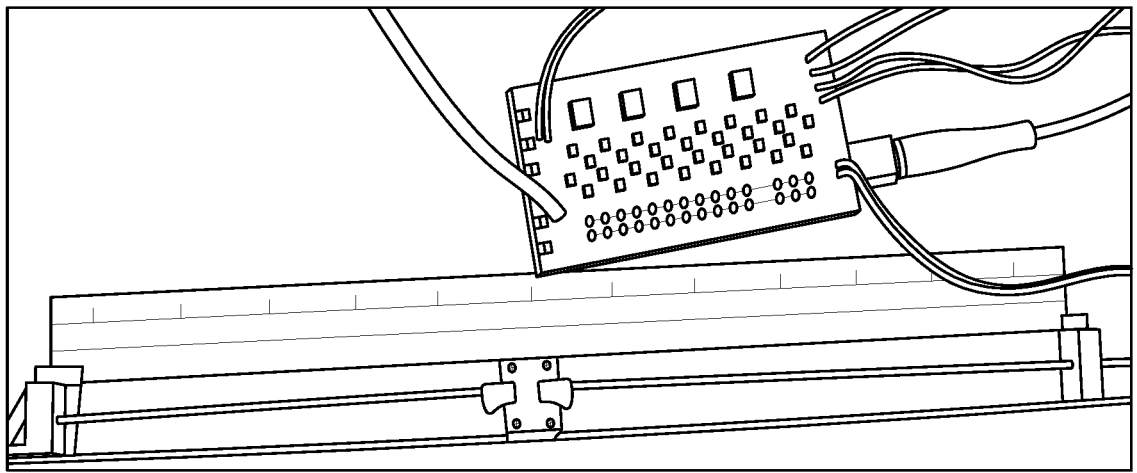
FIG. 14A. Set up used to measure output signal vs coupling length seen in FIG. 5F.
Figure 14B:
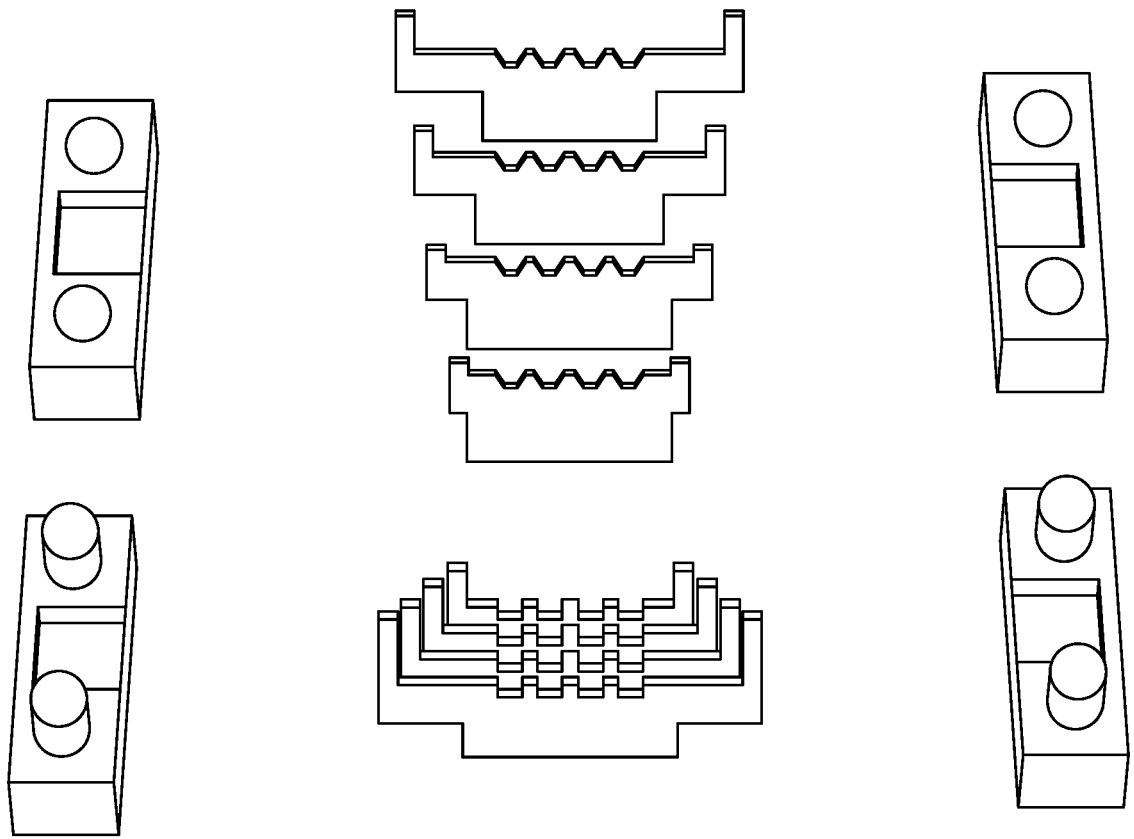
FIG. 14B. Test rig to control coupling length disassembled. Each piece is 1 mm thick. Data taken with a 2 MOhm gain on the OPAMP.

As expected, simulations (COMSOL Ray Optics) indicated a linear increase in the normalized coupled signal transmitted from the input lightguide to an output lightguide as the coupling length increased (FIG. 5E). The lightguides were modeled as lossless, square cross-sections with $n_{core}$=1.52, cladded by air, $n_{air}$=1.00. We set them to contact over a straight section of varied length, 0.1 mm<L<4.0 mm, on the output lightguide and measured the power of light coupled. The simulations also demonstrated that a minority fraction of the input light (<25%) coupled into the output lightguide along the direction of propagation in the powered core, so multiple signals can be read simultaneously from a single powered input lightguide. The correlation of signal intensity to core contact makes it possible to measure force or extent of deformation in addition to position. We experimentally confirmed that the sensor network functions due to changes in contact length by testing with two straight, cylindrical lightguides and observing the normalized signal intensity increase roughly linearly with coupling length (FIG. 5F; FIGS. 14A and 14B).

Sensor Characterization

Figure 7A:
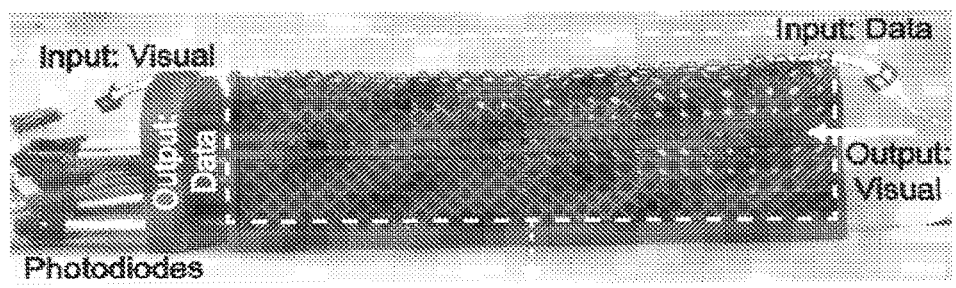
FIG. 7A. Exteroception. Musical instrument with fifteen output cores. A LED for visual feedback and the photodiodes for each output lightguide are shown on the left side. On the right side, a LED is placed to show light to be read by the photodiodes.

To optimize for input via finger press, the center-to-center spacing between the output lightguides was adjusted to be $w_2$=8.35 mm (FIG. 13B) such that a single touch between them caused the input lightguide to contact two neighboring output lightguides. After making this adjustment in the $SOLA_{1,3}$ device, an infrared (IR) LED was attached to an end of the input lightguide and photodiodes were attached to the end of one leg of each output lightguide to read the coupled light intensity (FIG. 7A). An elastomeric part was 3D printed to hold the end of each core in contact with a photodetector or LED using a friction fit.

The signals measured from the elastomeric lightguides used in the exemplary SOLA embodiment were repeatable in cyclic loading. Cyclic, constant force tests were run by pressing directly above each of the three output lightguides 20-30 times for each of five forces while recording the signal using the set up in FIG. 15. Across the n=300-400 total data points between 1.5-3.5 N, the average standard deviation $$\left(\overline{SD} = \frac{1}{n}\sum_{1}^{n}\frac{SD}{\text{signal}}\right)$$

in normalized output signal was $\overline{SD}$=0.02. The minimum force needed for a reliable signal to be read was found to be 1.5 N. The linear response of increasing signal to increasing force (FIG. 7B) also agreed with the trend seen in the simulation and experimental tests in FIGS. 5E and 5F.

Figure 16:
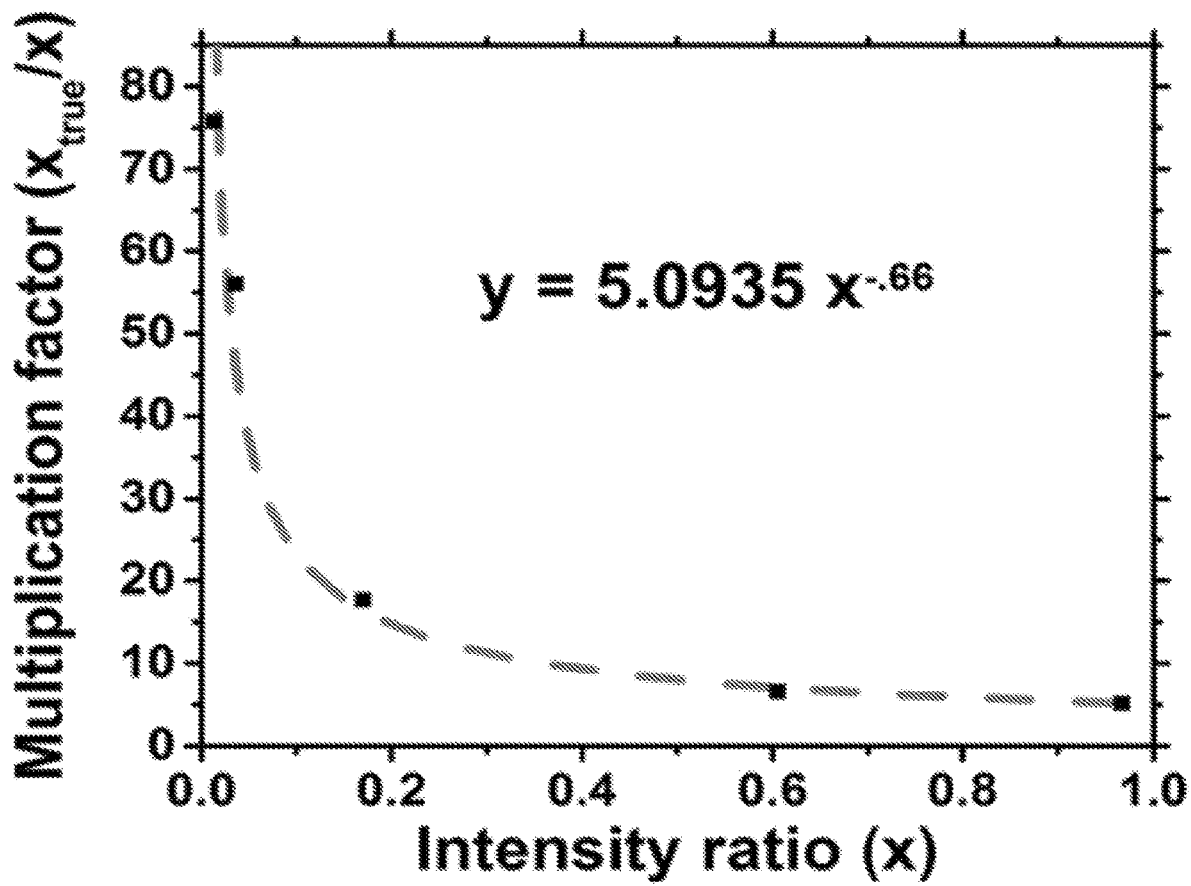
FIG. 16. Curve fit to find nonlinear multiplication factor for Equation 3. Only one set of data of presses between two outputs was used.

To measure the positional accuracy of the $SOLA_{1,3}$, the sensor was pressed every millimeter between the left and right output lightguides (FIGS. 7B-7D) and the maximum value from each output lightguide during the press was used to calculate position. From FIG. 6E, it can be seen the signals of two neighboring outputs overlapped when the sensor was pressed directly between, but do not when pressed directly above. This allows us to determine the position of the touch with the ratio of the left and right neighboring output intensities. The position of the touch was computed using Equation 3:

$$x_{calc} = x_{base} + 5.13 * \left(\frac{I_{Right}}{I_{Left} + I_{Right}}\right)^{.34} \quad (3)$$

where $x_{base}$ is the center of the closest output to the left, and I is the maximum signal during a press of either the left or right neighboring output. The ratio was fit to the true position for one set of data to find the nonlinear equation (FIG. 16). When only one output lightguide has a signal, the ratio is zero so the system assumes the press is directly above the center of that output. This introduces greater error (maximum error, $\text{Err}_{max}$=2.7 mm, average error, Err=0.71 mm) in areas of low overlapping signals (i.e., near the center of an output, FIG. 6E). While other models would result in higher overall accuracy (and are within the scope of the present disclosure), Equation 3 does not require prior knowledge of the magnitude of applied force because it relies on the ratio of intensities and not their absolute value. With this model, however, the sensor has sub-millimeter average positional accuracy, Err=0.71 mm, and standard deviation, SD=0.69 mm (FIG. 6F) which is comparable to the spatial resolution of touch sense in a human hand which is 2-3 mm.

Figure 6A:
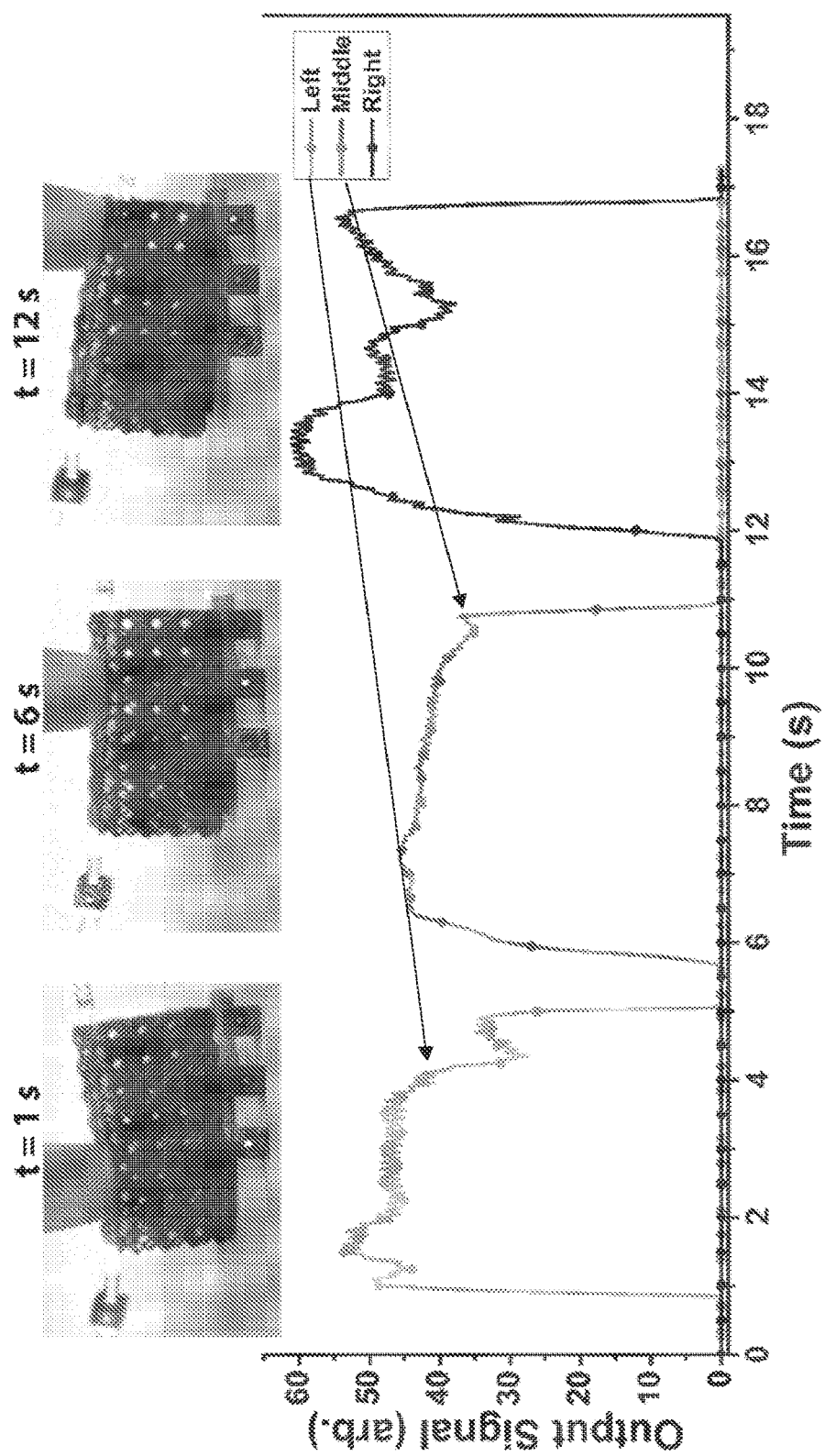
FIG. 6A. Signal readings of photodiodes when structure is (A) pressed directly over the left output, middle output, and right output.
Figure 6B:
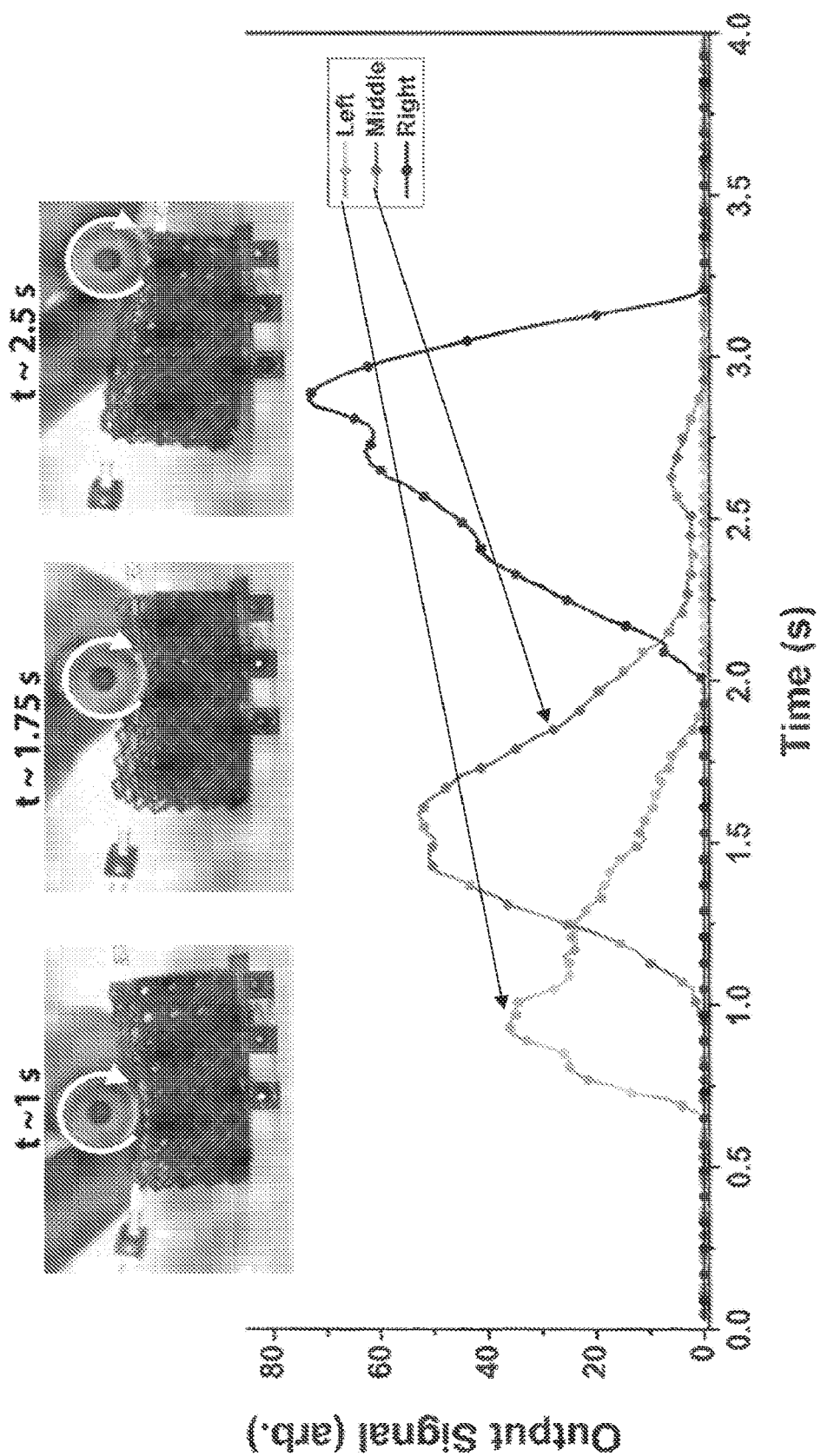
FIG. 6B. Signal readings of photodiodes when a cylinder is rolled over the top.
Figure 6D:
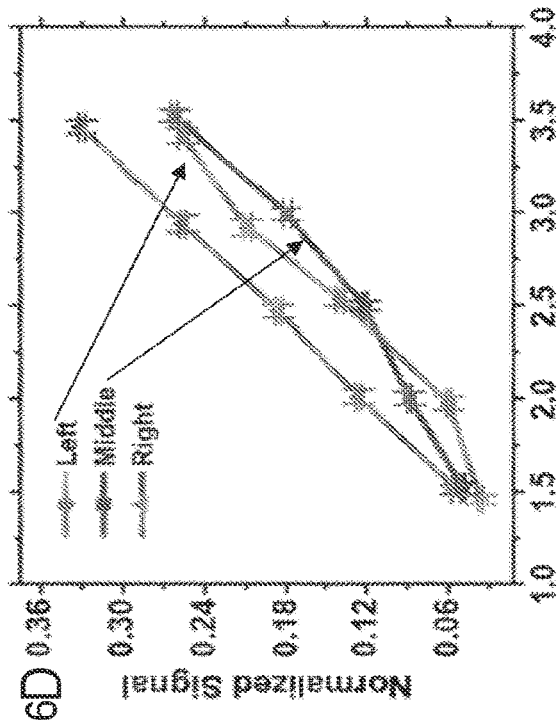
FIG. 6D. Sensor characterization. Averaged signal from each output when pressed over 20 times with increasing force reported with one standard deviation above and below.
Figure 6F:
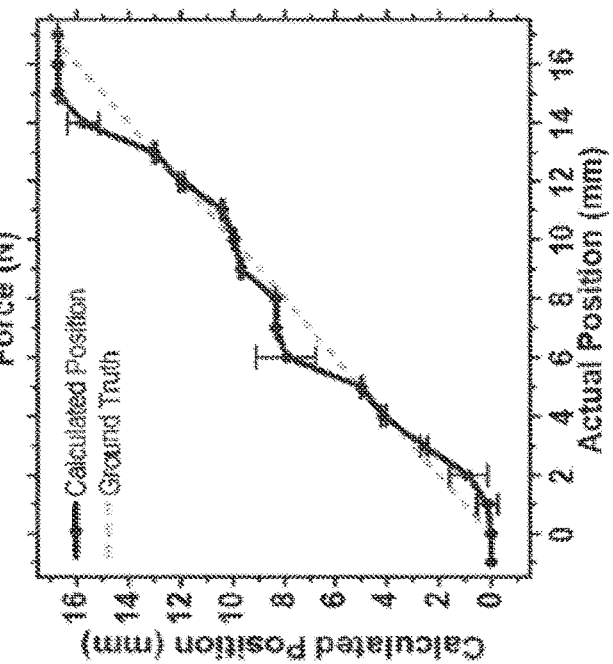
FIG. 6F. Sensor characterization. Average calculated vs actual position of eight samples of presses with a dotted line showing where the points would lie if 100% accurate.
Figure 6C:
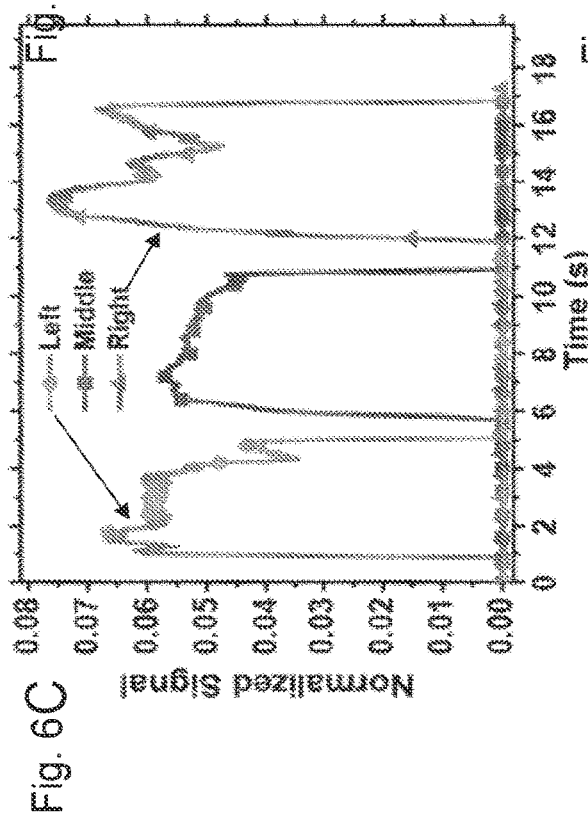
FIG. 6C. Sensor characterization. Normalized output signal during finger presses over the left, middle, and right output.
Figure 6E:
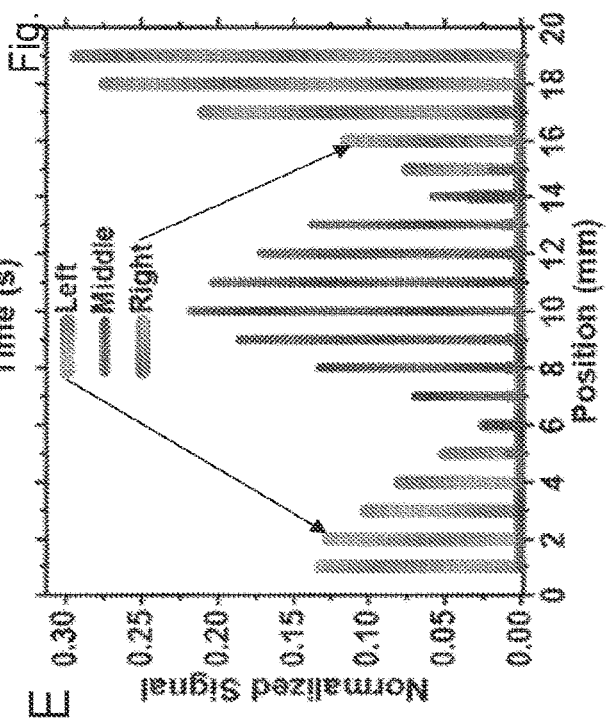
FIG. 6E. Sensor characterization. Signal from all three outputs as the $SOLA_{1,3}$ is pressed every millimeter long the input from the middle of the left to right outputs.

In FIG. 6B, the signal from a cylinder being rolled across all three outputs shows how the intensity of light that couples decreases roughly linearly as the distance to the point of deformation from the center of the output increases. This allows continuous position to be detected even with discrete readings, which is similar to how a human's sense of touch works.

Exteroception

Figure 7B:
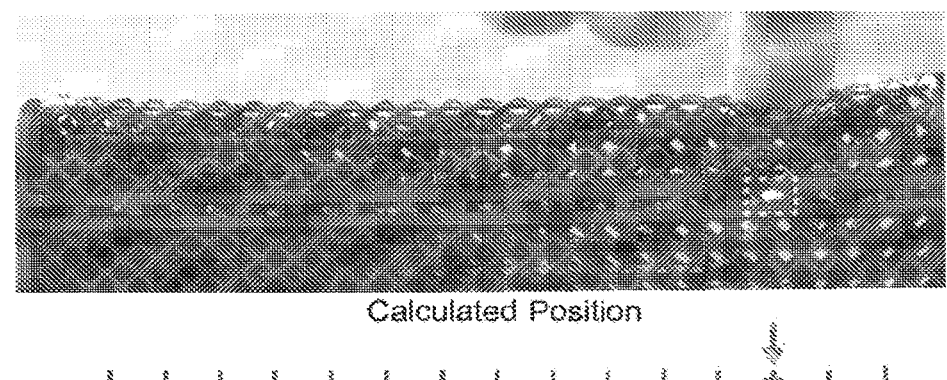
FIG. 7B. Exteroception. Musical instrument with fifteen output cores. Direct visual and computed locations of press positions directly on an output, FIG. 7C. Exteroception. Musical instrument with fifteen output cores. Direct visual and computed locations of press positions between outputs, FIG. 7D. Exteroception. Musical instrument with fifteen output cores. Direct visual and computed locations of press positions over four outputs simultaneously.
Figure 7C:
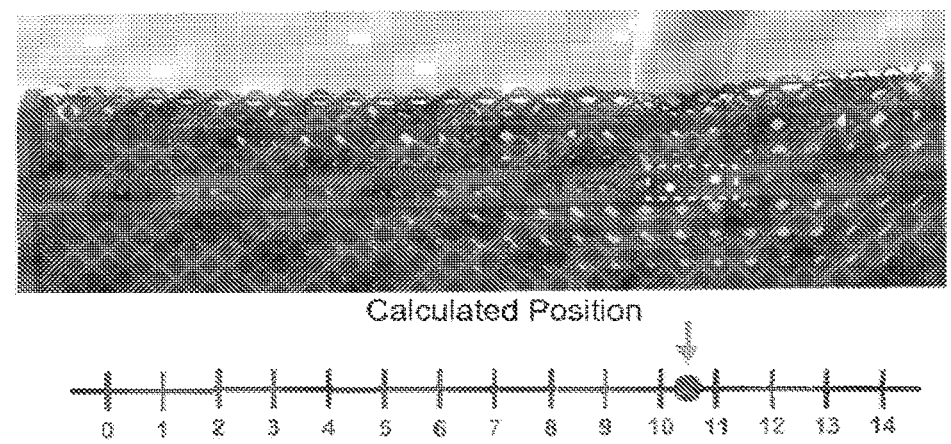
Figure 7D:
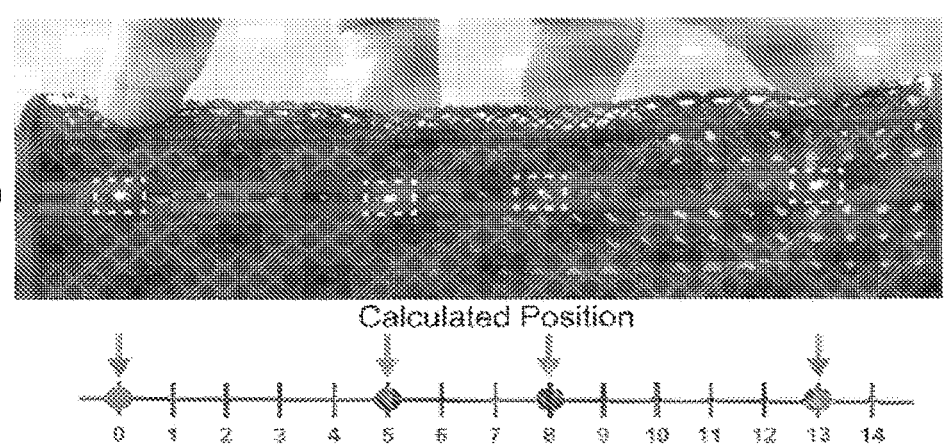
Figure 17:
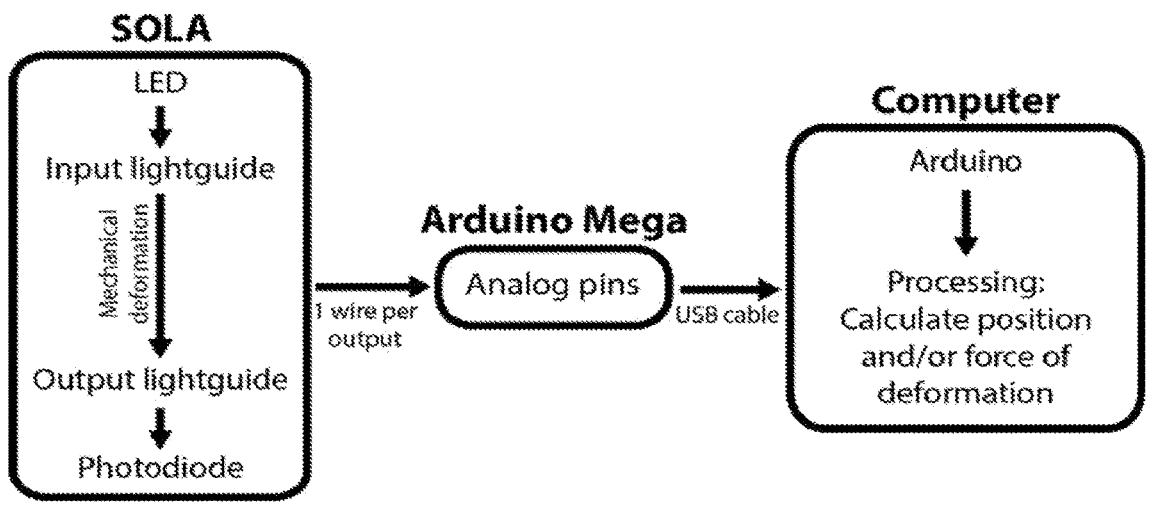
FIG. 17. Schematic of information flow from the SOLA to the visual and audio outputs on the computer.

To demonstrate the exteroceptive abilities of this system, a musical instrument was fabricated ($SOLA_{1,15}$) with fifteen output lightguides over a single 12.5 cm long input lightguide (FIG. 7A) using the same $w_1$ and $w_2$ as the $SOLA_{1,3}$ embodiment described above. Due to the light propagating through the input lightguide in one direction, the coupled light primarily travels in the same direction, and thus preferentially down one leg of the contacting output lightguide. We took advantage of this directionality by placing an LED on both sides of the input core and read the power from one leg of each U-shaped output lightguide threaded to the left side with a photodiode (FIG. 7A). The remaining leg was threaded to the front of the scaffold as a visual indicator of ground truth (FIG. 7A). By running each output lightguide through a different channel of the scaffold, we avoided any signal interference between output lightguides. The signals, read using photodiodes, were interpreted by an Arduino microcontroller communicating with the software package "Processing" on a laptop computer (FIG. 17) to produce auditory signals based on position of touch in real time. It also plotted the calculated position on a number line from 0-14 representing the analog pins associated with each of the fifteen output lightguides. FIGS. 7B-7D shows the calculated positions for a press directly above, between, and over multiple outputs, along with a representation of the press in the same position. Based on position calculations, the instrument played notes and detected gestures such as a slide.

Proprioception

Figure 11A:
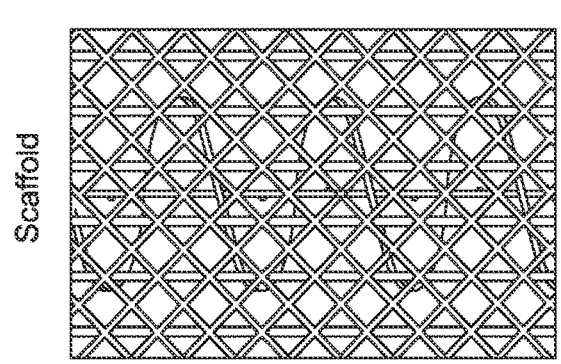
FIG. 11A. Proprioception. CAD model of each component of the cylinder and the completed device with three different stiffness sections.
Figure 11A:
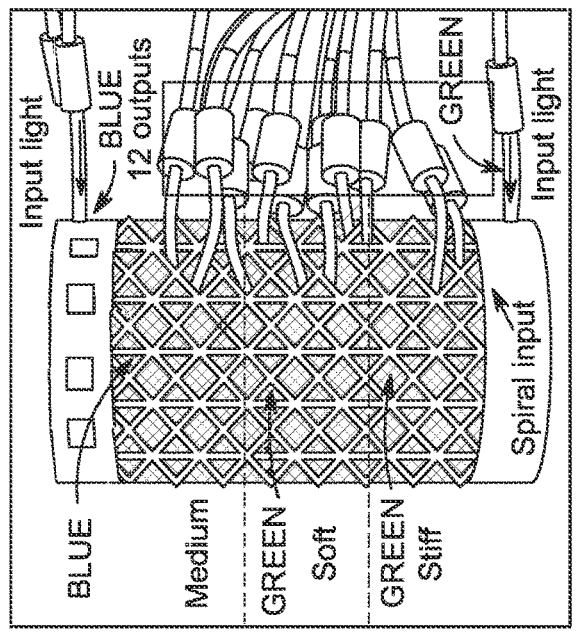
Figure 11A:
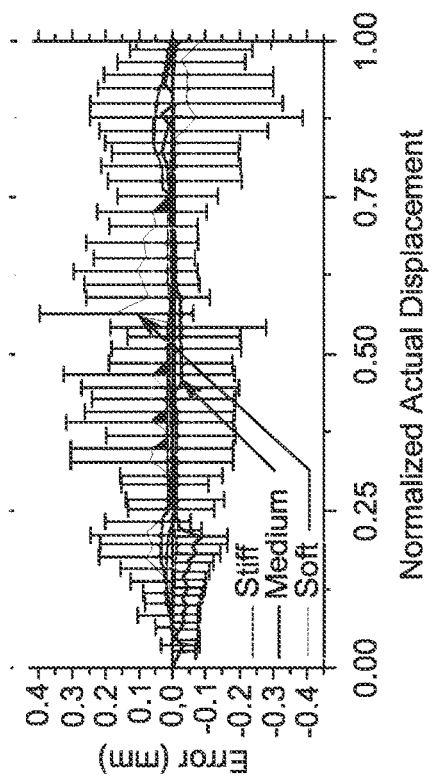
Figure 18:
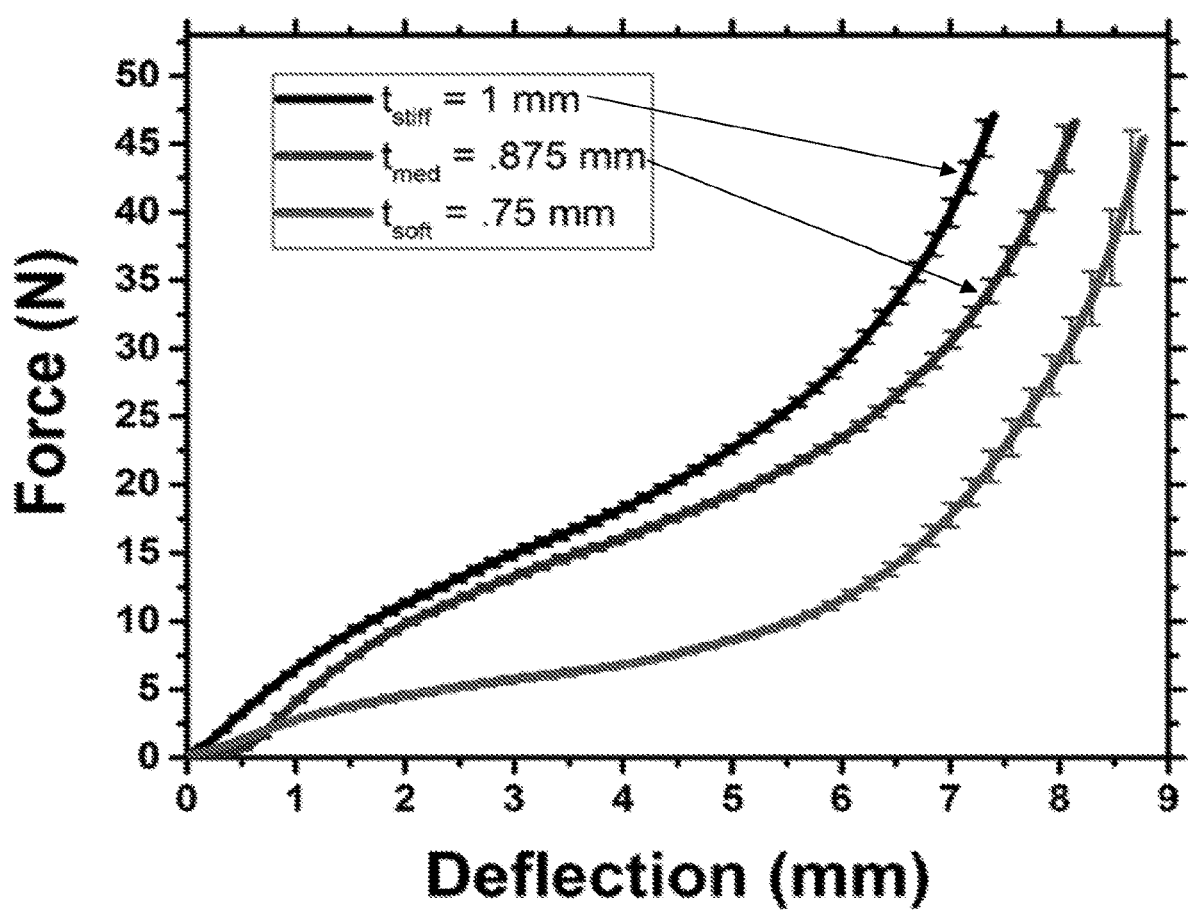
FIG. 18. Average individual compression data for eight samples of each of the three different stiffness sections of the cylinder in FIG. 11 with one standard deviation above and below. The compression test was run at 10 mm/min FIG. 19A. A cross section view of the lightguides in a $SOLA_{3,15}$ system.
Figure 19A:
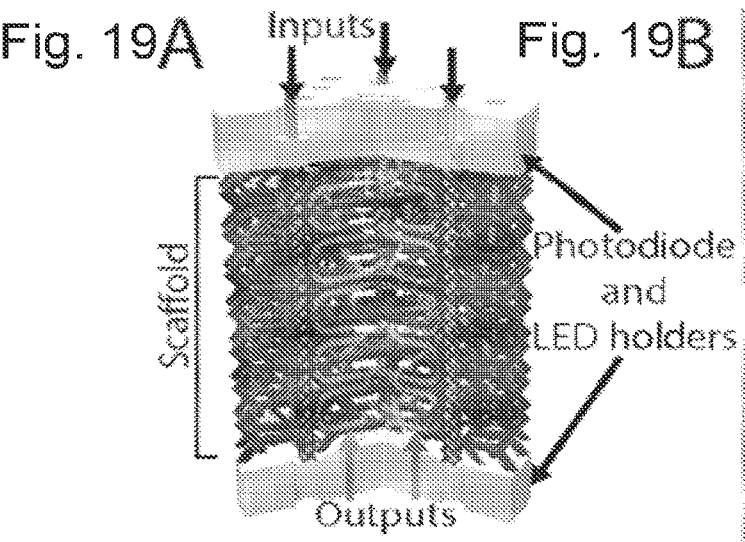
FIG. 19B. The completed $SOLA_{3,15}$.
FIG. 19C. Signals from the outputs as part of the cylinder is pressed.
FIG. 19D. Signals from the outputs as the cylinder is grabbed.
FIG. 19E. Signals from the outputs as the cylinder is bent.
FIG. 19F. Signals from the outputs as the cylinder is compressed.
Figure 19B:
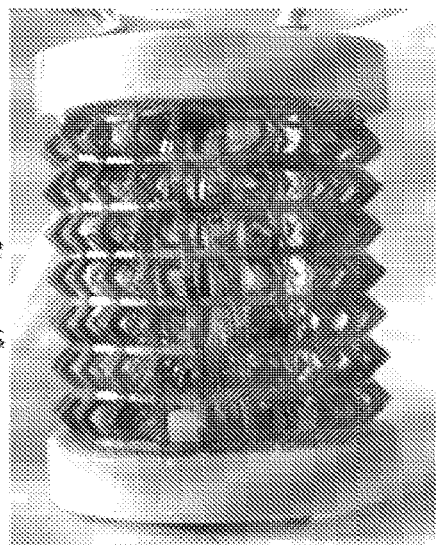
Figure 19C:
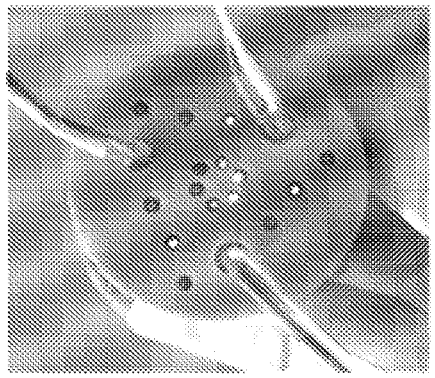
Figure 19D:
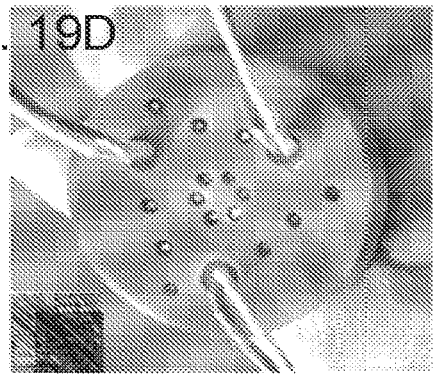
Figure 19E:
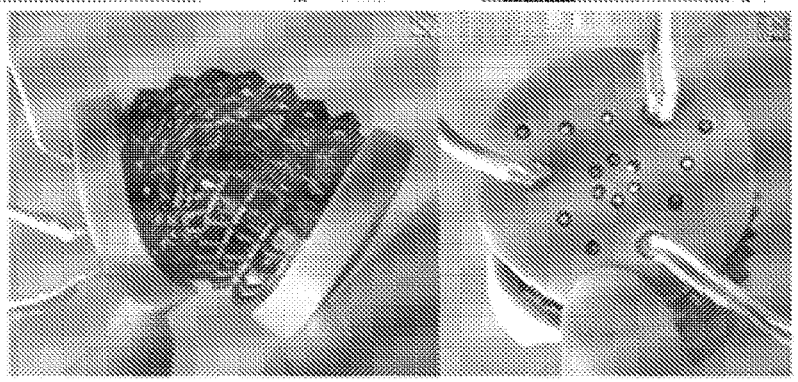
Figure 19F:
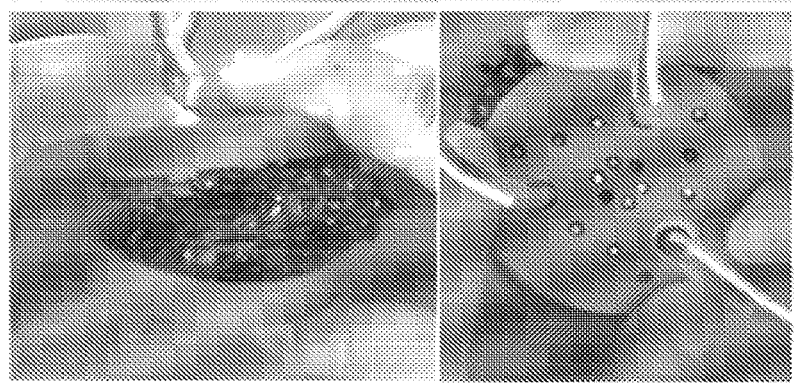
Figure 20A:
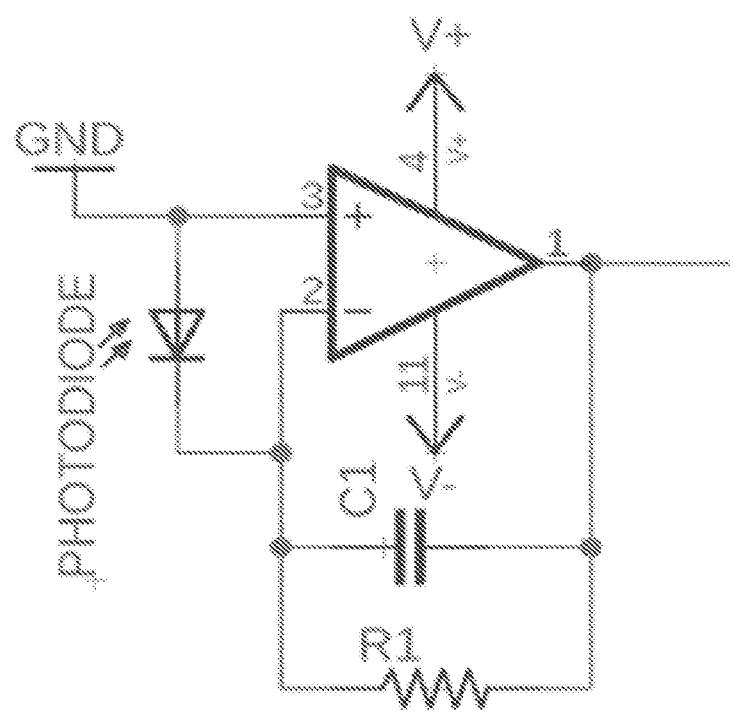
FIGS. 20A-20B. Schematic for exemplary current-to-voltage (I/V) converter circuit (FIG. 20A) used to amplify photodiode signal and LED circuit (FIG. 20B).
Figure 20B:
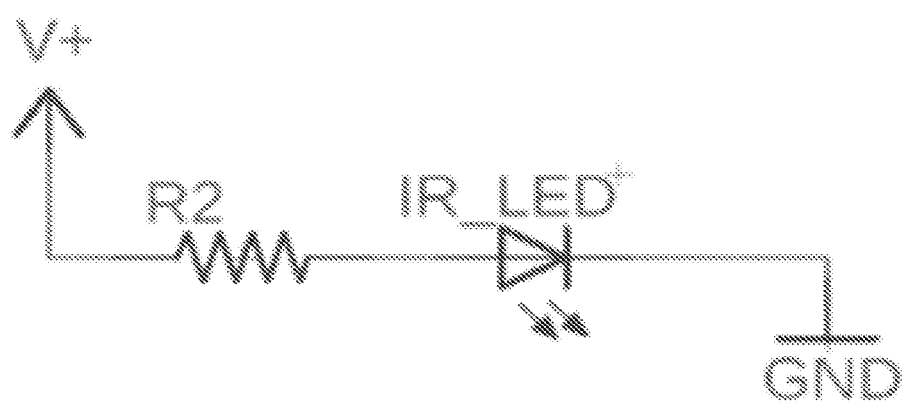

The data collected from an exemplary SOLA$_{1,12}$ embodiment (FIG. 11A) was used to reconstruct the 3D deformation state of a cylinder undergoing uniaxial compression (FIG. 11B). The cylinder was designed with three sections of different stiffnesses for easily distinguishable deformation by varying the strut thickness (FIGS. 11B and 18); from bottom to top: $t_{stiff}$=1 mm, $t_{soft}$=0.75 mm, $t_{medium}$=0.875 mm). By adding a stiff spiral with a powered waveguide core, the sensitivity of the SOLA was increased and swept out a larger volume for sensory information.

Figure 11E:
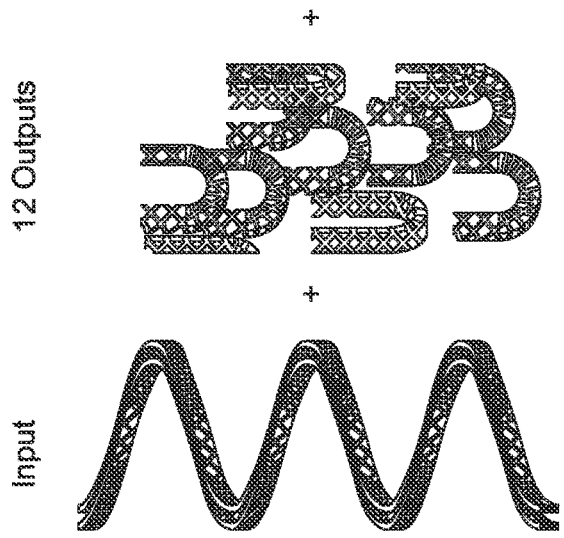
FIG. 11E. Proprioception. Average error in millimeters between calculated and actual displacement vs. normalized displacement for each stiffness section with one standard deviation above and below over nine single axis compression tests.
Figure 11E:
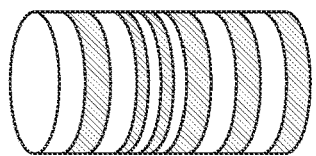
Figure 11E:
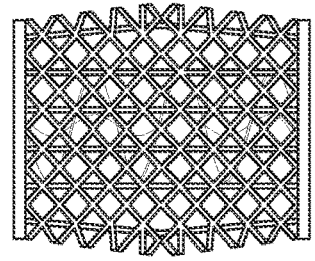
Figure 11E:
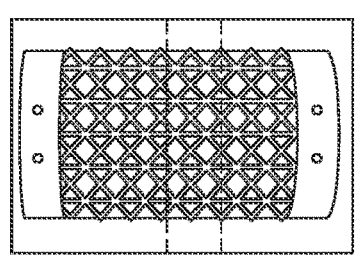

FIG. 11A shows this spiral input lightguide, illuminated using blue and green LEDs, and the twelve output lightguides positioned normal to it and along its length. To calculate the compression of each section, we obtained eighteen models of force vs localized displacement for every 2.2 mm of height from finite element analysis (FEA) data for the scaffold. The force in each section of the cylinder was measured using a linear model of signal intensity to force and the displacement of each section was calculated with the FEA model. The model and the reconstructed data are shown in FIGS. 11C and 11D. For model validation, the calculated strains were compared to those measured using a Digital Image Correlation (DIC) extensometer during single axis compression tests. The average magnitude of error over nine tests was 0.033, 0.33, 0.24 mm with a standard deviation of ±0.01, 0.24, 0.25 mm (FIG. 11E) for the stiff, medium, and soft sections respectively. These accuracies are comparable to the spatial accuracy of touch on a human's face, ~3 mm.

Theoretical Size Limitations of the Exemplary SOLA Embodiments

The exemplary SOLA systems described in this First Example may have inherent length limitations due to optical losses through and between lightguides, and via the sensitivity of photodetectors. Using lightguides having diameters of 1.5 mm, an 850 nm LED light source, and photodiodes amplified with an op-amp, the cut back method was used and the attenuation coefficient was measured to be α~0.18 dB cm$^{-1}$. We assumed no coupling losses, 10% transfer of power to each output lightguide, and an 8.35 mm spacing between output lightguides. The assumption of 10% power transfer was used because a 2 mm coupling length was assumed to be typical in the exteroceptive sensing case. Only absorption losses were considered, so losses due to cladding, bends, scattering, radiation, dispersion, surface roughness, and coupling were ignored. Absorption losses were calculated with $$\alpha * z = 10 * \log_{10}\left(\frac{P_o}{P_i}\right)$$

where z is the length of the lightguide, $P_i$ is the initial input power of the light, and $P_o$ is the output power of light after some length, z. We considered the minimum readable signal to be 1% of the maximum value to represent a discrete signal or no signal input. Inputs and outputs were considered only measurable from one side of a straight array so the length from the input of light to reading the output is 2z. The presently-described assumptions are utilized for illustrative purposes only and are intended to be non-limiting unless expressly stated otherwise.

On one end of the non-limiting theoretical limit presented here is the desire to read only one output at any point in time but to cover a large area. In this case, the input lightguide can be 78 cm long for the material and power system chosen in the exemplary embodiment. This length was calculated by solving for z in Equation 4:

$$P_o = c * \left(P_i * 10^{-z * \frac{\alpha}{10}}\right) * 10^{-z * \frac{\alpha}{10}} \tag{4}$$

where c is the percent of light coupled into the output lightguide. $P_i$ was determined to be 50,000 by fitting the model to experimental data.

On the other end of the theoretical limit is the desire to read all the outputs at any point in time even if the innervated area is small. In this case, the input lightguide can be 31 cm long with 37 outputs. This can be calculated with Equation 5:

$$P_o = c * (1-c)^{n-1} * \left(P_i * 10^{-.835 * n * \frac{\alpha}{10}}\right) * 10^{-\frac{\alpha}{10} * .835 * n} \tag{5}$$

where n is the number of outputs and 0.835 cm was the center to center spacing of the outputs.

In the present exemplary analysis, it was assumed the light distribution within the cores was uniform; however, lower order modes were concentrated to the center of the lightguides by the LED and become inaccessible to coupling at the distal end of the lightguides, likely resulting in shorter than predicted usable lengths.

DISCUSSION

Herein, a platform is demonstrated—a SOLA system—for more complex synthetic sensory networks. Its demonstrated first use is to continuously sense volumetric, localized deformations through optical coupling between elastomeric lightguides, which were concurrently designed into deformable 3D printed structures. This system submillimeter positional accuracy, which is comparable to the human hand, and precise force measurement (±2%, for 1.5-3.5 N) capabilities which can be used to track local deformations within an average 0.20±0.17 mm when using a model based on finite element analysis (FEA) simulations.

This accuracy can be increased, even under extreme deformation (35% compression) to an average 0.079±0.11 mm when using a model fit to experimental DIC data.

Using 3D printing, a SOLA embodiment can be customized to be sensitive to specific modes of deformation (tension, compression, bending, twisting) and the direction of deformation in desired areas. It is possible to use multi-input core SOLAs to sense more deformation modes over a larger volume (FIG. 19). Furthermore, the use of 3D printing to fabricate the scaffold allows easy adjustment of the strut thickness, architecture, and waveguide channel density of the scaffold to tune the SOLA to, for example, respond to lower forces, or with higher spatial resolution.

It is again noted that the embodiments described in the example are intended to be non-limiting. Other substrate and/or waveguide configurations may be used and are within the scope of the present invention. For example, the curve of a U-shaped output waveguide could be made flatter so that the magnitude of deformation needed to cause coupling more even between outputs. Waveguides having cuboid cores (or other shapes) can be used to reduce the chances of waveguides slipping past one another at high forces. Other core materials can be used to absorb less light (lower attenuation), and higher power LEDs (or more of them) and/or more sensitive photodetectors can be used to increase the maximum working volume of the device.

Methods

System Fabrication

Variable stiffness scaffolding was designed using Fusion 360 (Autodesk, Inc.; FIG. 13) and 3D printed the SOLA scaffolding from a commercial elastomeric polyurethane (EPU) material on a Carbon M1 printer. The top ~8 mm was designed to have a thinner strut thickness, t=0.75 mm, compared to the rest of the scaffold, t=1.125 mm, which created an area that was sensitive to external touch. Within the scaffolding were lattice-walled channels to hold the lightguides with thin, $t_{clad}$=0.4 mm, walls to minimize the effect on the mechanical properties of the structure. The scaffold was fully cured after being in an oven for eight hours at 120° C. after excess resin was removed in an isopropyl alcohol wash.

A thin monofilament string (Darice jewelry designer, 81b) was threaded through each channel in the printed scaffold and affixed the end to a commercial, clear, soft, polyurethane core (Stretch Magic, Pepperell) with a refractive index of 1.52 and diameter $d_{out}$=1.0 mm for the output lightguides and $d_{in}$=1.5 mm for the input lightguide. The cores were pulled into place with the string.

For the proprioception cylinder, the output lightguide U-shape size and spacing was changed to fill the available space to be innervated. The output lightguides were 6.8 mm wide and spread out to be every 9 mm along the input so that each one represented about 2.5 mm of height on the cylinder. They are parallel to the compression axis as this caused the input lightguide and output lightguides to be pressed together during compression. The U-shapes were also curved to match the spiral so that the line-contact between input and output lightguides increased with more compression (deformation). The input lightguide was designed as a spiral as opposed to a zigzag or s-curve to avoid any sharp curves that would introduce more light loss.

Force and Positional Accuracy Measurements

Figure 15:
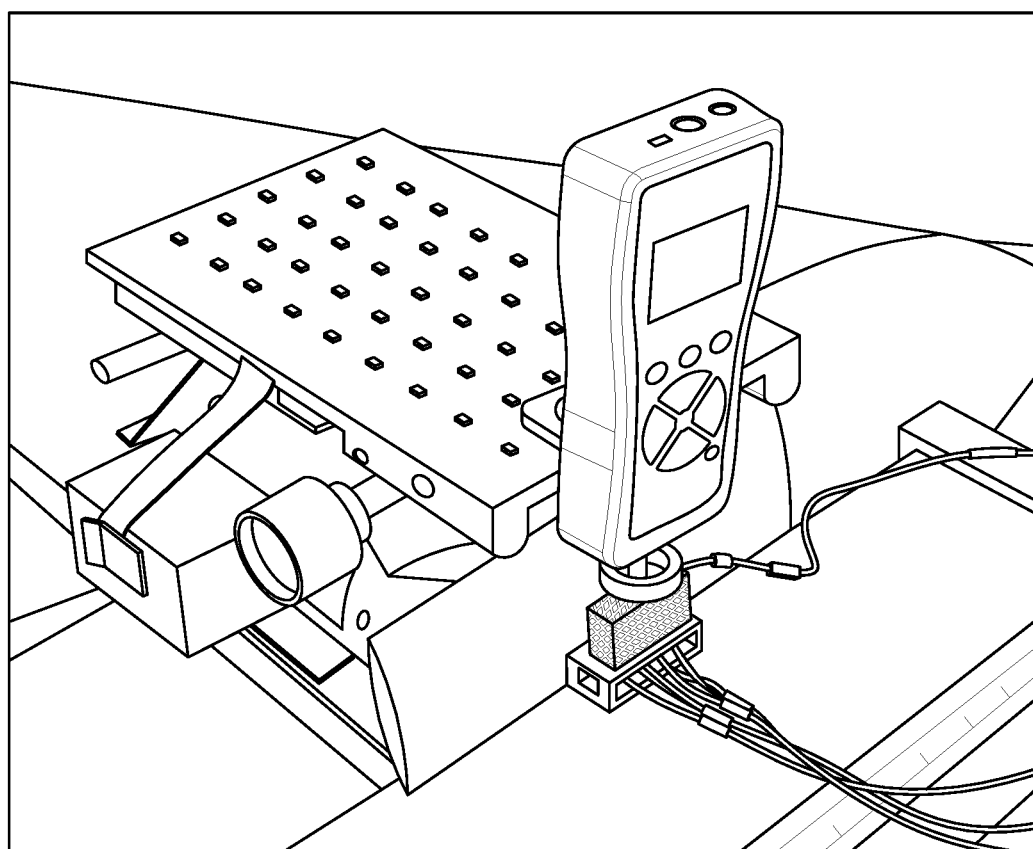
FIG. 15. Setup to take force and position data in FIG. 6.

A digital force tester was mounted to a vertical lift stage and attached a 3D printed finger phantom to its end (FIG. 15). A SOLA$_{1,3}$ was attached to a Delrin block and a ruler to the acrylic sheet under it so presses every millimeter along the length (FIG. 15) could be measured. To apply a force, the vertical lift stage was lowered to press the finger phantom into the sample until the desired force was read. From the collected data, the maximum value from each output for each press was used, defined as a chain of non-zero signal values, and normalize them by 800, the maximum value possibly read from the sensor. To find the nonlinear portion of Equation 3, the actual position, $x_{true}$, was divided by the ratio of neighboring output signals, $$x = \frac{I_{Right}}{I_{Left} + I_{Right}},$$

to get a multiplication factor. The factor was plotted by the ratio and fit a curve in Excel (Microsoft, Inc.) (FIG. 16). The factor was multiplied by x and added to $x_{base}$ to get the final equation.

Proprioception Accuracy Measurements

The cylinder was placed between two parallel plate attachments of the Z010 Zwick Roell tensile tester using a 10 kN load cell and ran the compression test at 10 mm/min while acquiring data from the sensors and filtered with an exponential filter with a smoothing constant of 0.9 using an Arduino. To measure the localized deformations experimentally, the front face of the cylinder was marked with a silver mark every 2.5 mm and tracked the dots using digital image correlation (DIC) extensometer with VIC Snap and VIC-2D (Correlated Solutions, Inc.) and convert the pixel positions of the dots to displacements. From the sensor data, the signal magnitude was correlated to force with a linear model. The model was created using MATLAB to fit a sixth-degree polynomial to the localized displacement and force values from the FEA simulation done in ANSYS. The error of the calculated displacements was found using error= abs(disp$_{calc}$−disp$_{DIC}$).

Additional Characterization of Exemplary Embodiments

Figure 4:
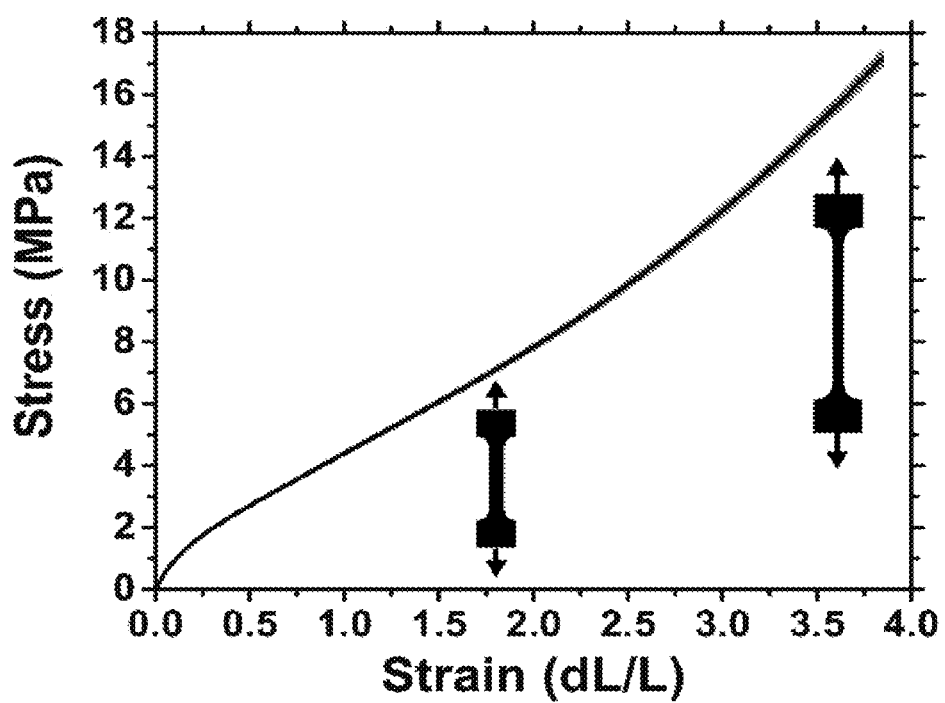
FIG. 4. Tensile test data of dumbbell shaped samples.

To characterize the mechanical properties of the 3D printed material, uniaxial tensile tests were performed according to the ISO 37 method with a type 4 dumb-bell sample geometry. The test was run at 200 mm/min on a Z010 Zwick Roell using a 10 kN load cell with pneumatic grips pressurized at 85 psi. The averaged data with standard error of eleven samples is shown in FIG. 4A. The data shows somewhat exaggerated strains due to the sample slowly slipping out of the grips.

COMSOL ray optics simulations of light coupling from a straight core into a contacting, U-shaped output core over a range of coupling lengths was performed with a parametric sweep. The coupling length was defined as the length of the straight section of each output lightguide in contact with the input lightguide. The cores were approximated as lossless, square cross section solids with a refractive index of 1.52 surrounded by air. The side length of the square was set to be the diameter of the respective core, 1.5 mm for the input and 1 mm for the output. The geometry was approximated as squares over circles as it was easier to define a constant contact area with changing length. In reality, the width of the contact area would change due to higher forces increasing the deformations of the cores under contact. Walls were setup at both ends of each core to measure the light intensity at those areas. Input light was set up through the "Release from Grid" module, entering from one of the input ends in a uniform density cone of 400 rays with a cone angle of π/12 and a total power of 1 Watt. Rays leaving the cores were suppressed. The simulation was solved using the ray tracing solver over a path length of 0-300 mm with a step size of 0.1 mm. The parametric sweep was done from a coupling length of 0.1-4.5 mm with a step size of 0.1 mm. The transmittance at the end of the output core is plotted vs the coupling length in FIG. 5A. From the images of the traced rays in FIG. 5A, it can be seen that the light preferentially enters one side of the output due to the propagating direction of the rays in the input which agrees with what is seen in reality. Other than the approximated geometry of the cores, the model also does not capture the deformation in of the input core which affects the amount and direction of light leaked into the output.

Figure 5B:
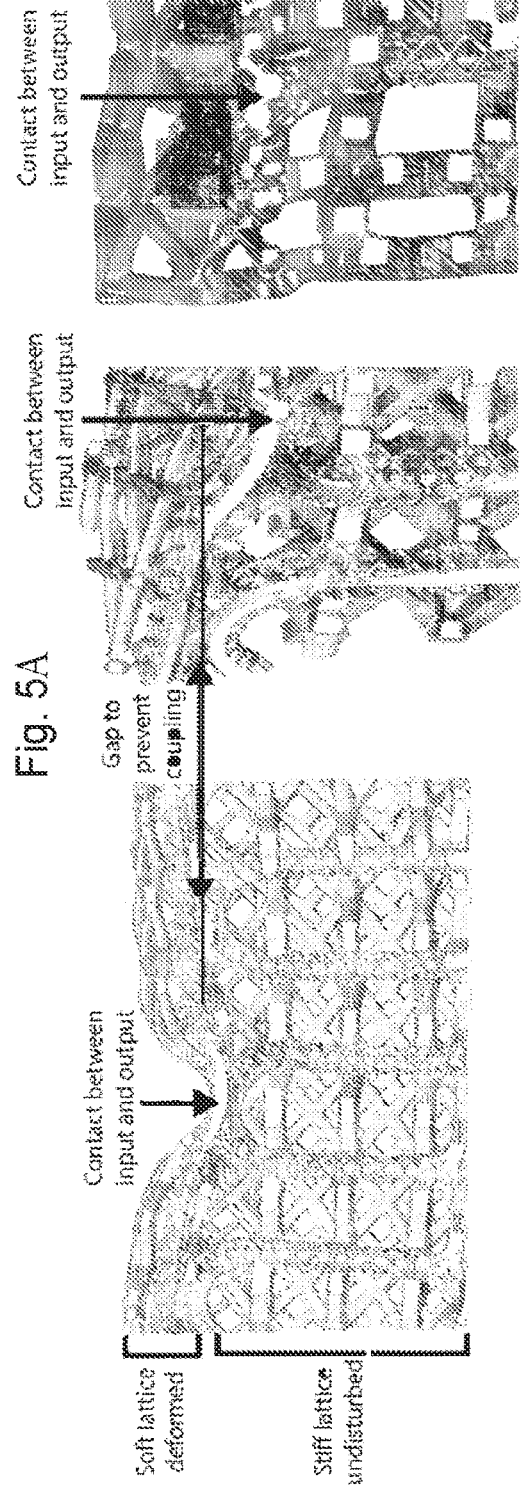
FIG. 5B. CT scans show that at the point of external force, the input and output cores are forced to touch, allowing light to couple while the deformation is not transferred to the next output lines, ensuring accuracy of signal reading.

To examine the deformations within the lattice and the contact between cores, an x-ray μCT scan of a sample complete with cores, held in a deformed state was done on an Xradia Zeiss Versa XRM-520 run at 100 kV/9 W with 0.7 second exposure time and a 36.7 μm resolution. The images were reconstructed into a 3D part in the software Aviso after removing the bar causing the deformation. The reconstruction was then thresholded to remove background noise and sliced to remove the rest of the rig and show the cores in FIG. 5B. From the slices, it is clear that the soft lattice deforms first as the stiffer lattice appears undisturbed even when the soft part is completely buckled. Under large deformations, the input core is shown to slip past the output until they are in contact side by side instead of on top of each other. The gap above the other output cores shows that the deformation is localized to the press so extraneous signals do not exist.

In the following, various Examples of the present disclosure are described:

Example 1. A device comprising a deformable substrate; a first waveguide disposed in the substrate; a second waveguide disposed in the substrate; wherein the first waveguide and the second waveguide are arranged to couple when the substrate is deformed by an external force, thereby permitting electromagnetic radiation to be transmitted between the first waveguide and the second waveguide.

Example 2. The device of Example 1, wherein the deformable substrate is a polymer lattice.

Example 3. The device of Example 2, wherein the polymer lattice comprises a plurality of struts each having a strut diameter of 0.75 mm to 1.125 mm.

Example 4. The device of Example 1, wherein the deformable substrate is a monolithic material.

Example 5. The device of one of Examples 1-4, wherein the deformable substrate comprises an elastomer.

Example 6. The device of one of Examples 1-4, wherein the deformable substrate comprises silicone, polyurethane, polyacrylate, and/or any similar polymer.

Example 7. The device of one of Examples 1-4, wherein the substrate has an elastic modulus of 10 kPa to 100 MPa.

Example 8. The device of Example 1, wherein the first waveguide is parallel with the second waveguide.

Example 9. The device of Example 1, wherein the first waveguide is orthogonal to the second waveguide.

Example 10. The device of Example 1, wherein the first waveguide is adjacent to the second waveguide at a location along each of the first waveguide and the second waveguide.

Example 11. The device of one of Examples 8-10, wherein the first waveguide and the second waveguide are separated by a distance less than or equal to 5 mm when the substrate is not deformed.

Example 12. The device of Example 1, wherein the first waveguide and the second waveguide each comprise at least one of clear silicone, clear polyurethane, clear polyacrylate, and/or any polymer with a similar refractive index.

Example 13. The device of Example 1, wherein the first waveguide has a diameter of 100 μm to 1 cm.

Example 14. The device of Example 1, wherein the second waveguide has a diameter of 100 μm to 1 cm.

Example 15. The device of Example 1, wherein the first and second waveguides are configured to transmit electromagnetic radiation having a wavelength in the IR range through the visible range.

Example 16. The device of one of the preceding Examples, wherein a plurality of the second waveguides are disposed in the deformable substrate.

Example 17. The device of Example 16, wherein each of the plurality of second waveguides independently has a same or different length.

Example 18. The device of one of Examples 16 and 17, wherein each of the plurality of second waveguides independently has a same or different diameter.

Example 19. The device of any one of the preceding Examples, wherein coupling between the first waveguide and the second waveguide increases with an amount of the external force thereby increasing electromagnetic radiation transmitted between the first waveguide and the second waveguide.

Example 20. The device of any of the preceding Examples, further comprising a detector configured to receive electromagnetic radiation from the second waveguide; and a controller in electronic communication with the detector, the controller configured to determine a position and/or magnitude of the external force based on electromagnetic radiation received at the detector.

Example 21. A method, comprising providing a device that includes: a deformable substrate; a first waveguide is disposed in the substrate; and a second waveguide disposed in the substrate, wherein the first waveguide and the second waveguide are configured to couple when the substrate is deformed; transmitting electromagnetic radiation through the first waveguide; deforming the substrate with an external force; and coupling the first waveguide with the second waveguide as the substrate is deformed by the external force, thereby transmitting at least a portion of the electromagnetic radiation of the first waveguide through the second waveguide.

Example 22. The method of Example 21, wherein coupling between the first waveguide and the second waveguide increases with an amount of the external force thereby increasing electromagnetic radiation transmitted from the first waveguide to the second waveguide.

Although the present disclosure has been described with respect to one or more particular embodiments, it will be understood that other embodiments of the present disclosure may be made without departing from the spirit and scope of the present disclosure.

What is claimed is:

1. A device comprising:
   a deformable substrate,
   a first waveguide with at least a portion of the first waveguide disposed in the deformable substrate;
   a second waveguide with at least a portion of the second waveguide disposed in the deformable substrate;
   wherein the first waveguide is spaced apart from the second waveguide in a first state in which the deformable substrate is not deformed and has a first volume or a first porosity;
   wherein the first waveguide and the second waveguide are arranged to directly couple in a second state, responsive to deformation of the deformable substrate by an external force, to cause electromagnetic radiation to be transmitted from at least one of the first waveguide and the second waveguide to another of the first waveguide and the second waveguide, in which the deformable substrate is deformed and has a second volume or a second porosity; and wherein the deformable substrate is a lattice, scaffold, or network.

2. The device of claim 1, wherein the deformable substrate comprises one or more air gaps configured to separate the first waveguide and the second waveguide.

3. The device of claim 1, wherein the deformable substrate comprises an elastomer.

4. The device of claim 1, wherein the deformable substrate comprises silicone, polyurethane, or polyacrylate.

5. The device of claim 1, wherein the substrate has an elastic modulus of 10 kPa to 100 MPa.

6. The device of claim 1, wherein the first waveguide and the second waveguide are arranged at an angle relative to each other.

7. The device of claim 1, wherein the first waveguide is parallel to the second waveguide.

8. The device of claim 1, wherein the first waveguide is adjacent to the second waveguide at a location along each of the first waveguide and the second waveguide.

9. The device of claim 1, wherein the first waveguide and the second waveguide are separated by a distance less than or equal to 5 mm when the substrate is not deformed.

10. The device of claim 9, wherein the first waveguide and the second waveguide comprise at least one coupling region when the substrate is deformed.

11. The device 10, wherein more electromagnetic radiation is coupled between the first waveguide and the second waveguide when the distance between the first and second waveguides is reduced under an increased magnitude of the external force applied to the flexible substrate.

12. The device of claim 1, wherein a normalized coupled signal is transmitted from at least one of the first waveguide and the second waveguide to another of the first waveguide and the second waveguide substantially linear to an increasing force or a coupling length.

13. The device of claim 1, wherein the first waveguide has a diameter of 100 μm to 1 cm, or the second waveguide has a diameter of 100 μm to 1 cm.

14. The device of claim 1, wherein the first and second waveguides are configured to transmit electromagnetic radiation having a wavelength in the IR range through the visible range.

15. The device of device of claim 1, further comprising:
a detector configured to receive electromagnetic radiation from the second waveguide; and
a controller in electronic communication with the detector, the controller configured to determine a position and/or magnitude of the external force based on electromagnetic radiation received at the detector.

16. The device of claim 1, wherein the first waveguide and the second waveguide are arranged to couple only when the deformable substrate is deformed.

17. A method, comprising:
providing a device of claim 1;
transmitting electromagnetic radiation through the first waveguide; and
coupling the first waveguide with the second waveguide responsive to deformation of the deformable substrate by an external force-to cause at least a portion of the electromagnetic radiation of the first waveguide to be transmitted through the second waveguide.

18. A device comprising:
a deformable substrate comprising a plurality of first elongated members in a first direction, and a plurality of second elongated members in a second direction with one or more air gaps therebetween to define a porosity of the deformable substrate;
a first waveguide with at least a portion of the first waveguide disposed in the deformable substrate;
a second waveguide with at least a portion of the second waveguide disposed in the deformable substrate;
wherein the first waveguide is spaced apart from the second waveguide in a first state in which the deformable substrate is not deformed; and
wherein the first waveguide and the second waveguide are arranged to directly couple in a second state, responsive to deformation of the deformable substrate by an external force, to cause electromagnetic radiation to be transmitted from at least one of the first waveguide and the second waveguide to another of the first waveguide and the second waveguide.

19. The device of claim 18, wherein the deformable substrate comprises a polymer or an elastomer.

20. The device of claim 18, wherein the deformable substrate is a lattice, scaffold, or network.

21. The device of claim 18, wherein the substrate has an elastic modulus of 10 kPa to 100 MPa.

22. The device of claim 18, wherein the first waveguide and the second waveguide are separated by a distance less than or equal to 5 mm when the substrate is not deformed.

23. The device of claim 18, wherein more electromagnetic radiation is coupled between the first waveguide and the second waveguide when the distance between the first and second waveguides is reduced under an increased magnitude of the external force applied to the flexible substrate.

24. The device of claim 18, wherein a normalized coupled signal is transmitted from at least one of the first waveguide and the second waveguide to another of the first waveguide and the second waveguide substantially linear to an increasing force or a coupling length.

25. The device of device of claim 18, further comprising:
a detector configured to receive electromagnetic radiation from the second waveguide; and
a controller in electronic communication with the detector, the controller configured to determine a position and/or magnitude of the external force based on electromagnetic radiation received at the detector.

* * * * *